(12) United States Patent
Yamamoto et al.

(10) Patent No.: US 7,100,675 B2
(45) Date of Patent: Sep. 5, 2006

(54) AIR CONDITIONER FOR VEHICLE

(75) Inventors: Takehiro Yamamoto, Hiroshima (JP);
Tadashi Okamoto, Hiroshima (JP);
Hideaki Yasuda, Hiroshima (JP);
Hiroshi Mayumi, Hiroshima (JP);
Morihito Tsukuda, Hiroshima (JP);
Kenichiro Higashi, Hiroshima (JP);
Keiji Koga, Hiroshima (JP); Yoshinori Aono, Hiroshima (JP)

(73) Assignee: Japan Climate Systems Corporation, Hiroshima (JP)

( * ) Notice: Subject to any disclaimer, the term of this patent is extended or adjusted under 35 U.S.C. 154(b) by 318 days.

(21) Appl. No.: 10/250,920

(22) PCT Filed: Aug. 30, 2002

(86) PCT No.: PCT/JP02/08847

§ 371 (c)(1),
(2), (4) Date: Jul. 8, 2003

(87) PCT Pub. No.: WO03/020542

PCT Pub. Date: Mar. 13, 2003

(65) Prior Publication Data

US 2004/0069480 A1    Apr. 15, 2004

(30) Foreign Application Priority Data

Sep. 3, 2001  (JP) ............................. 2001-265798
Sep. 3, 2001  (JP) ............................. 2001-265815
Sep. 3, 2001  (JP) ............................. 2001-265833

(51) Int. Cl.
*B60H 1/00* (2006.01)
*B60H 3/00* (2006.01)

(52) U.S. Cl. ...................... 165/42; 165/43; 62/244; 62/291; 237/2 A

(58) Field of Classification Search ............... 165/41, 165/42, 43, 202, 203, 204, 248, 287, 247; 62/244, 159, 245, 291; 237/2 A
See application file for complete search history.

(56) References Cited

U.S. PATENT DOCUMENTS

| 5,755,107 | A | 5/1998 | Shirota et al. |
| 5,860,593 | A * | 1/1999 | Heinle et al. ............... 165/204 |
| 6,474,406 | B1 * | 11/2002 | Sano et al. .................. 165/42 |
| 2003/0006033 | A1 * | 1/2003 | Kawada et al. ............ 165/202 |
| 2004/0182562 | A1 * | 9/2004 | Smith et al. ................ 165/202 |

FOREIGN PATENT DOCUMENTS

| DE | 19534738 | 3/1996 |
| JP | 49-132536 A | 12/1974 |
| JP | 62-192908 A | 12/1987 |
| JP | 8-104129 | 4/1996 |

(Continued)

OTHER PUBLICATIONS

Apr. 20, 2004 Office Action for JP Application No. 2001-265833.

*Primary Examiner*—Ljiljana Ciric
(74) *Attorney, Agent, or Firm*—Nixon Peabody LLP; Donald R. Studebaker

(57) ABSTRACT

In an air conditioner (1) constructed to pass an air introduced into an air conditioning unit (4) through an evaporator (33) and a heater core (34) both arranged in the unit (4), cooler pipes (90) for the evaporator (33) and heater pipes (91) for the heater core (34) are arranged to extend from the same side wall of the air conditioning unit (4).

11 Claims, 24 Drawing Sheets

FOREIGN PATENT DOCUMENTS

| | | | | | | |
|---|---|---|---|---|---|---|
| JP | 9-123748 | 5/1997 | JP | 2000-318430 | | 11/2000 |
| JP | 11-091338 | 4/1999 | JP | 2001-039144 | | 2/2001 |
| JP | 11-263118 | 9/1999 | JP | 2001-206051 | * | 7/2001 |
| JP | 11-348527 | 12/1999 | JP | 2001-213142 | | 8/2001 |

* cited by examiner

FIG. 24
(a)
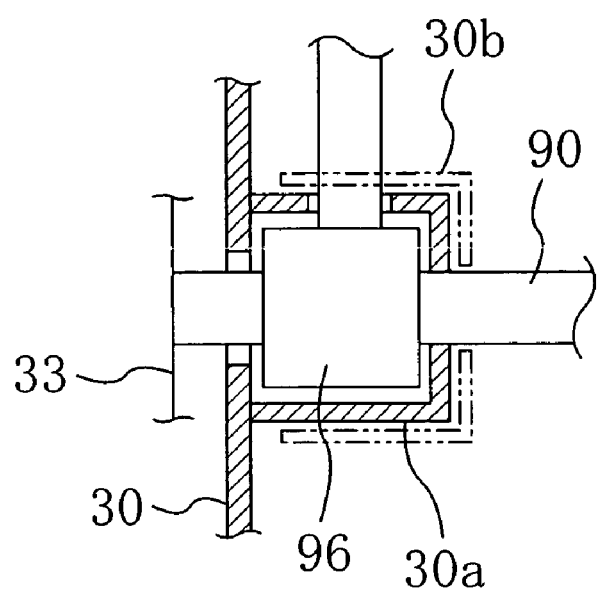
(b)
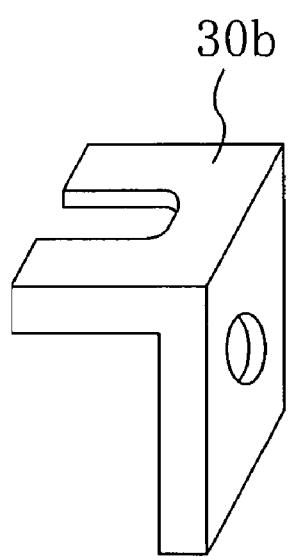

AIR CONDITIONER FOR VEHICLE

TECHNICAL FIELD

This invention generally relates to vehicle air conditioners, and particularly relates to the technical field for layout structures of heater pipes and cooler pipes which are disposed around an air conditioning unit.

BACKGROUND ART

There has been conventionally known an exemplary vehicle air conditioner including an air conditioning unit with a cooling heat exchanger and a heating heat exchanger and an air blowing unit for blowing air into the air conditioning unit, for example, as disclosed in Japanese Unexamined Patent Publication No. 9-123748. The air conditioning and air blowing units are disposed inside of an instrument panel so as to be located substantially in the widthwise middle of a car and toward the front-passenger's seat, respectively.

The air conditioning unit is provided at its bottom end side with an air inlet leading from the air blowing unit. An air introduced into the air conditioning unit through the inlet passes through the cooling and heating heat exchangers, which are located above the inlet and substantially horizontally arranged one above the other, and is guided into the passenger's room through a duct extending from above the heat exchangers. With this air conditioning unit, juxtaposition of two heat exchangers one above the other allows the air conditioning unit to be downsized and thereby to be reduced in its installation space.

In the above prior art air conditioner disclosed, cooler pipes for an evaporator as a cooling heat exchanger and heater pipes for a heater core as a heating heat exchanger are arranged at the side wall of the air conditioning unit toward the air blowing unit or at the opposite side wall thereof. A drain port is provided at a suitable position of a bottom wall part of the air conditioning unit to drain off water downward.

Also, in the prior art air conditioner, the cooler pipes and heater pipes are attached to a dash panel disposed at the front of the air conditioning unit, but there is no clear description about specific positions at which the pipes are actually attached to the dash panel.

Furthermore, in the above prior art, the bottom end of the vertically elongated air conditioning unit is located in the vicinity of the floor of the vehicle body, whereas the air blowing unit has to be disposed sufficiently away from the floor in order to obtain legroom at the front of the front-passenger's seat. This invites a large level difference between the outlet of the air blowing unit and the inlet of the air conditioning unit. In this case, in order to smoothly send the air from the blowing unit to the air conditioning unit, it is necessary to space both the units away from each other by a predetermined distance or more in the car widthwise direction.

DISCLOSURE OF INVENTION

The present invention has been made in view of the foregoing points. The present invention is directed to a vehicle air conditioner in which a cooling heat exchanger and a heating heat exchanger are disposed in an air conditioning unit and air is sent from an air blowing unit disposed at the front-passenger's side of the air conditioning unit to the bottom end of the air conditioning unit, and has an object of facilitating the attachment of heater pipes and cooler pipes to a vehicle body (dash panel) and further reducing the size of the air conditioner.

Solutions of the present invention taken to attain the above object are characterized in that the heater pipes and cooler pipes are arranged at the same side of the air conditioning unit so as to be located close to each other, and, in particular, both pipes are extended out of a side wall of the air conditioning unit located toward the air blowing unit, brought into proximity to each other and then bent substantially at a right angle toward the dash panel.

More specifically, a first solution according to claim 1 of the invention is directed to a vehicle air conditioner comprising: an air conditioning unit disposed substantially in the middle of the inside of an instrument panel in a widthwise direction of a vehicle; an air blowing unit disposed to a front-passenger's side of the air conditioning unit; an intermediate duct for ducting an air from the air blowing unit to the air conditioning unit; and a cooling heat exchanger and a heating heat exchanger disposed in the air conditioning unit, in which the air introduced from the intermediate duct into the air conditioning unit is allowed to pass through the cooling and heating heat exchangers disposed in the air conditioning unit to produce a conditioned air. Further, cooler pipes connected to the cooling heat exchanger and heater pipes connected to the heating heat exchanger are arranged to extend from the same side of the air conditioning unit in the widthwise direction of the vehicle.

With this configuration, the heater pipes and the cooler pipes are arranged at the same side of the air conditioning unit. Therefore, in attaching the air conditioning unit to the dash panel, alignment can be made easily and workability of attachment can be increased. Since the heater pipes and the cooler pipes are arranged in proximity to each other, this enables downsizing of the air conditioning unit.

A second solution according to claim 2 of the invention is directed to a vehicle air conditioner comprising: an air conditioning unit disposed substantially in the middle of the inside of an instrument panel in a widthwise direction of a vehicle; an air blowing unit disposed to a front-passenger's side of the air conditioning unit; and an intermediate duct for ducting an air from the air blowing unit to the air conditioning unit; in which the air introduced from the intermediate duct into the air conditioning unit is allowed to pass through a cooling heat exchanger and a heating heat exchanger juxtaposed one above the other in the air conditioning unit to produce a conditioned air. In this air conditioner, cooler pipes connected to the cooling heat exchanger and heater pipes connected to the heating heat exchanger are arranged to extend from the same side of the air conditioning unit in the widthwise direction of the vehicle.

With this configuration, like the solution according to claim 1, workability of air conditioning unit attachment can be increased and the air conditioning unit can be made compact.

With a third solution according to claim 3 of the invention, in the vehicle air conditioner of claim 1 or 2, the cooler pipes and heater pipes are extended from the same side wall of the air conditioning unit, bent substantially at a right angle, brought into proximity to each other and then extended toward the front of the vehicle. Therefore, a space located laterally from the side wall of the air conditioning unit can be effectively used, and the air conditioning unit can be arranged in proximity to the dash panel, which increases the utilization area of the passenger's room.

With a fourth solution according to claim 4 of the invention, in the vehicle air conditioner of any one of claims 1 to 3, the cooler pipes and heater pipes are extended from a side wall of the air conditioning unit, bent substantially at a right angle, brought into proximity to each other and then extended toward the front of the vehicle, and all the cooler and heater pipes pass through through holes in proximity to each other in a dash panel disposed at the front of the air conditioning unit to locate distal ends thereof in an engine room beyond the dash panel. This facilitates the attachment of the air conditioning unit to the dash panel and improves sealing properties between all the pipes and the dash panel.

With a fifth solution according to claim 5 of the invention, in the vehicle air conditioner of claim 3 or 4, the side wall of the air conditioning unit from which the cooler pipes and heater pipes are extended is at the side of the air conditioning unit located toward the air blowing unit, and the cooler pipes and heater pipes are extended from between the air conditioning unit and the air blowing unit toward the front of the vehicle. Therefore, the space between the air conditioning unit and the air blowing unit can be effectively used. Furthermore, a space located laterally from the air conditioning unit and opposite to the air blowing unit, i.e., a space on the driver's side of the air conditioning unit, can be obtained amply. Alternatively, a large-sized temperature-control duct can be provided on the driver's side wall of the air conditioning unit to effectively carry out the temperature control on the passenger's room.

With a sixth solution according to claim 6 of the invention, in the vehicle air conditioner of any one of claims 1 to 5, a bracket for supporting the cooler pipes and heater pipes is formed integrally with the air conditioning unit, and the bracket supports portions of the cooler pipes and heater pipes extending toward the front of a vehicle body. In this manner, all the pipes are supported to a common bracket. Therefore, all the pipes can be held stably at predetermined positions of the air conditioning unit, and the number of components can be reduced thereby providing cost reduction.

With a seventh solution according to claim 7 of the invention, in the vehicle air conditioner of claim 6, the heater pipes include a supply pipe for supplying a heat medium for heat application to the heating heat exchanger, and a return pipe from the heat medium for heat application, the supply pipe and the return pipe are supported to the bracket so as to be arranged one above the other, and the cooler pipes are supported to the bracket below the heater pipes. Therefore, all the pipes and the bracket can be arranged compactly, and all the pipes can be firmly supported.

With an eighth solution according to claim 8 of the invention, in the vehicle air conditioner of claim 6 or 7, the bracket is formed to be separable on vertical center lines of all the cooler and heater pipes, and one separate piece of the bracket is formed integrally with the air conditioning unit, while the other separate piece is attached detachably to said one separate piece. This facilitates attachment and detachment of the cooler pipes and ensures alignment thereof.

With a ninth solution according to claim 9 of the invention, in the vehicle air conditioner of any one of claims 6 to 8, openings for cooler pipes formed in the bracket have a diameter with a predetermined clearance left from the outer diameter of the cooler pipes, the bracket includes a seal plate detachable with respect to the openings for cooler pipes, and the cooler pipes are fixed to the bracket by fitting the seal plate to the bracket.

Therefore, in detaching the expansion valve connected to the cooling heat exchanger and presented laterally from the side wall of the air conditioning unit, the above structure provides slight freedom of movement for the cooler pipes.

As a result, the expansion valve can be detached easily without removal of the bracket, which facilitates detachment work.

With a tenth solution according to claim 10 of the invention, in the vehicle air conditioner of claim 9, the seal plate has a groove for a cooler pipe, the groove has a width greater than the diameter of the cooler pipe and smaller than the diameter of the opening of the bracket, and the seal plate is detachable substantially at a right angle with respect to the cooler pipe. Therefore, the seal plate can stably secure the cooler pipe to the bracket, and detachment of the seal plate can be easily carried out in a narrow space.

With an eleventh solution according to claim 11 of the invention, in the vehicle air conditioner of any one of claims 6 to 10, the bracket has a flat surface opposed to the dash panel disposed at the front of the air conditioning unit, and the flat surface is capable of being pressed against the peripheries of the openings for heater pipes and the openings for cooler pipes in the dash panel. This provides improved sealing properties between the dash panel and the pipes, and excellent waterproof, sound insulating and heat insulating properties. Furthermore, since the dash insulators surrounding the openings can be held by the flat surface, the dash insulators can be prevented from peeling.

With a twelfth solution according to claim 12 of the invention, in the vehicle air conditioner of any one of claims 1 to 11, the cooler pipe is connected to the cooling heat exchanger through an expansion valve, the expansion valve is disposed adjacent the outer surface of a side wall of the air conditioning unit located toward the air blowing unit, an extended wall is formed integrally with the outer surface of the side wall to cover the periphery of the expansion valve, a cover is provided to cover the extended wall, and the expansion valve is capable of being covered with the extended wall and the cover.

With this configuration, the extended wall and the cover prevents the expansion valve from being exposed to the outside air without any special work such as tightly wrapping the expansion valve with rubber sealing member, which significantly improves workability. Furthermore, the expansion valve can be easily attached and detached.

With a thirteenth solution according to claim 13 of the invention, in the vehicle air conditioner of any one of claims 1 to 12, the cooling heat exchanger is disposed so as to be inclined downwardly in a rear to front direction of a vehicle body, the cooling heat exchanger is provided with a plurality of flat tubes which are stacked in the widthwise direction of the vehicle to extend in the lengthwise direction of the vehicle body and through which a refrigerant flows, a corrugate fin is interposed between the adjacent flat tubes, and the lower end of the corrugate fin is located above the lower ends of the flat tubes.

With this configuration, condensate produced in the cooling heat exchanger can easily flow along the lower ends of the flat tubes in a rear to front direction of the vehicle body. Therefore, the condensate can be promptly recovered from the cooling heat exchanger, which significantly reduces that the condensate is transferred above the cooling heat exchanger.

With a fourteenth solution according to claim 14 of the invention, in the vehicle air conditioner of any one of claims 1 to 13, a drain port is provided in a bottom wall part of the air conditioning unit, and the drain port is disposed at the same side of the air conditioning unit at which the cooler pipes and the heater pipes are arranged, in proximity to the cooler pipes and the heater pipes, and toward the front of the vehicle body. Therefore, the drain pipe can be arranged collectively with the heater and cooler pipes, which provides their compact layout. Furthermore, since the drain pipe and the heater and cooler pipes can be attached together to the dash panel, this improves workability of assembly and sealing properties between the pipes and the dash panel.

With a fifteenth solution according to claim 15 of the invention, in the vehicle air conditioner of claim 14, a drain passage continuous with the drain port is provided, and the exit of the drain passage is extended, together with the cooler pipes and the heater pipes, from the side wall of the air conditioning unit located toward the air blowing unit. This enables effective use of a space between the air conditioning unit and the air blowing unit, and provides utilization of the opposite side wall of the air conditioning unit and extension of a space on the driver's seat side of the air conditioning unit.

With a sixteenth solution according to claim 16 of the invention, in the vehicle air conditioner of claim 15, a drain pipe is connected to the exit of the drain passage, and the drain pipe is disposed toward the front of the vehicle body. Therefore, the drain pipe, the heater pipes and the cooler pipes can be arranged collectively in the same direction toward the dash panel. This provides compact piping layout and significantly improves workability of attachment of the pipes to the dash panel.

With a seventeenth solution according to claim 17 of the invention, in the vehicle air conditioner of any one of claims 1 to 16, the heating heat exchanger and the cooling heat exchanger are arranged substantially horizontally in the air conditioning unit with the heating heat exchanger located above the cooling heat exchanger, the cooling heat exchanger is inclined downwardly in a rear to front direction of the vehicle body, a lower space into which an air from the intermediate duct is introduced is provided under the cooling heat exchanger, a bottom wall part of the air conditioning unit is provided under the lower space, a drain port is formed in the bottom wall part integrally with the air conditioning unit, and a drain passage continuous with the drain port is extended from the side wall part of the air conditioning unit and disposed closer to the front of the vehicle body than the intermediate duct.

Therefore, the drain passage and the cooler pipes can be disposed between the air conditioning unit and the air blowing unit without interfering with the intermediate duct. In another aspect, the intermediate duct can be arranged to send an air from the air blowing unit to the air conditioning unit effectively without being affected by the drain passage and the cooler pipes.

With an eighteenth solution according to claim 18 of the invention, in the vehicle air conditioner of claim 16 or 17, the heater pipes and the cooler pipes are supported one above another to the bracket, and the drain pipe is disposed below the cooler pipes. Therefore, the heater and cooler pipes can be disposed in a compact and collective arrangement.

With a nineteenth solution according to claim 19 of the invention, in the vehicle air conditioner of any one of claims 15 to 18, an attachment part through which the air conditioning unit is attached to a dash panel disposed at the front of the air conditioning unit is provided integrally with the drain passage in proximity to the exit of the drain passage. This increases the rigidity of surroundings of the drain passage, and enables the drain passage to be attached stably at a predetermined position of the dash panel thereby increasing the precision of assembly.

With a twentieth solution according to claim 20 of the invention, in the vehicle air conditioner of any one of claims 13 to 19, a bottom wall part of the air conditioning unit has an inclined surface that is lowest in level at the drain port, is highest in level at the corner diagonally opposite to the drain port and is thus gradually downwardly inclined from the diagonally opposite corner toward the drain port. Therefore, condensate in the air conditioning unit can be smoothly guided to the drain port.

With a twenty-first solution according to claim 21 of the invention, in the vehicle air conditioner of any one of claims 1 to 20, the intermediate duct has an inclined duct connected to the air blowing unit and inclined obliquely downwardly from the air blowing unit toward the air conditioning unit, and a horizontal duct connected with the inclined duct and the air conditioning unit to form a substantially horizontal air passage.

With this configuration, an air flowing through the intermediate duct is smoothly changed in direction from an obliquely downward flow to an approximate horizontal flow and then introduced into the air conditioning unit. Therefore, the air flow colliding with the bottom wall part is significantly reduced, resulting in providing an excellent function of preventing condensate in the bottom wall part from being involved into the air flow.

With a twenty-second solution according to claim 22 of the invention, in the vehicle air conditioner of claim 21, the bottom wall part of the air conditioning unit has an inclined surface that is lowest in level at the drain port, is highest in level at the corner diagonally opposite to the drain port and is thus gradually downwardly inclined from the diagonally opposite corner toward the drain port, the middle of the bottom wall part is provided with a flat surface portion, and the drain passage is also inclined downwardly from the drain port toward the exit of the drain passage. Therefore, an air introduced into the air conditioning unit is better separated from condensate guided to the drain port, resulting in a prompt discharge of the condensate and a smooth air flow.

With a twenty-third solution according to claim 23 of the invention, in the vehicle air conditioner of any one of claims 13 to 22, a rib is provided in a standing manner on the bottom wall part of the air conditioning unit and along the flowing direction of the air introduced through the intermediate duct, and the drain port is provided in a portion of the bottom wall part closer to the front of the vehicle body than the rib.

With this configuration, the rate of air flow sent from the intermediate duct to the air conditioning unit is smaller in the portion of the bottom wall part closer to the front of the vehicle body than the rib. Therefore, condensate can be effectively prevented from being taken into the cooling heat exchanger located above by the air flow.

With a twenty-fourth solution according to claim 24 of the invention, in the vehicle air conditioner of any one of claims 1 to 23, the heating heat exchanger and the cooling heat exchanger are arranged substantially horizontally in the air conditioning unit with the heating heat exchanger located above the cooling heat exchanger, the cooling heat exchanger is inclined downwardly in a rear to front direction of the vehicle body, a lower space into which an air from the intermediate duct is introduced is provided under the cooling heat exchanger, a bottom wall part of the air conditioning unit is provided under the lower space, the cooling heat exchanger is inclined downwardly in a rear to front direction of the vehicle body, the intermediate duct has an approximately triangular section at a connected portion with the lower space, the intermediate duct has an inclined duct inclined obliquely downwardly from the air blowing unit toward the air conditioning unit, and a horizontal duct connected from the inclined duct to the air conditioning unit to form a substantially horizontal air passage, the inclined duct has an approximately rectangular section at a connected portion with the air blowing unit, and the inclined duct has an approximately triangular section at a connected portion with the horizontal duct.

With this configuration, air smoothly flows through the intermediate duct, a partial air flowing through one side of the horizontal duct having a larger sectional area, i.e., a portion thereof located toward the rear of the vehicle body, is introduced at high speed into the air conditioning unit, and a partial air flowing through the other side of the horizontal duct is introduced at low speed into the air conditioning unit. Therefore, the high-speed air flow inside of the air conditioning unit is smoothly introduced to the cooling heat exchanger, resulting in improved heat exchanger effectiveness.

With a twenty-fifth solution according to claim 25 of the invention, in the vehicle air conditioner of any one of claims 1 to 24, the air conditioning unit is provided with a temperature control damper for controlling the temperature of a conditioned air by changing the ratio of the flow rate of air passing through the heating heat exchanger to the flow rate of air introduced into the air conditioning unit, and a blow-out direction switching damper for changing the blow-out direction of the conditioned air, and drive mechanisms and actuators for driving the temperature control damper and the blow-out direction switching damper, respectively, are disposed on the side wall of the air conditioning unit located toward the air blowing unit.

With this configuration, an air from the air blowing unit smoothly flows through the intermediate duct, is introduced into the lower space of the air conditioning unit, is turned upward, and then passes through the cooling and heating heat exchangers. During the time, the temperature control damper is driven by the actuator via the drive mechanism, the temperature of the conditioned air is controlled by changing the ratio of the flow rate of air passing through the heating heat exchanger to the flow rate of air introduced into the air conditioning unit. The conditioned air produced in this manner is changed in blow-out direction by the blow-out direction switching damper, and then supplied to a desired place in the passenger's room.

In this case, the drive mechanisms and actuators for the two dampers are disposed on the side wall of the air conditioning unit located toward the air blowing unit, and collected in a dead space between the air blowing unit and the air conditioning unit which are spaced apart from each other by a distance between both ends of the intermediate duct. This makes the air conditioner more compact and reduces its installation space. Furthermore, collective arrangement of the two actuators decreases the number of processes for assembly of the air conditioning unit and the number of processes for attachment thereof to the vehicle body.

With a twenty-sixth solution according to claim 26 of the invention, in the vehicle air conditioner of claim 25, the temperature control damper is formed of two damper members, and control of swing motions of the two damper members allows the ratio of the flow rate of air passing through the heating heat exchanger to be changed thereby controlling the temperature of the conditioned air.

In general, to increase the area of the air passage for introduction of air into the heating heat exchanger or bypassing of the heating heat exchanger, it is required to provide a large-area temperature control damper for swing motion. This involves increasing the distance between the cooling and heating heat exchangers, resulting in increased height of the air conditioning unit. Unlike this, in this invention, the temperature control damper between the cooling and heating heat exchangers is formed of two damper members. Therefore, the area of the air passage for introduction of air into the heating heat exchanger or bypassing of the heating heat exchanger can be increased without the space between both the heat exchangers being increased.

With a twenty-seventh solution according to claim 27 of the invention, in the vehicle air conditioner of claim 26, the two damper members are controlled to differ from each other in their opening/closing timings at which air passages toward the heating heat exchanger are opened or shut off. This provides precise temperature control.

With a twenty-eighth solution according to claim 28 of the invention, in the vehicle air conditioner of any one of claims 1 to 27, the air blowing unit is provided with an inside/outside air switching damper for controlling the amount of air taken in from the outside of a passenger's room and the amount of air taken in from the inside of the passenger's room, and an actuator for driving the inside/outside air switching damper is disposed on a side wall of the air blowing unit located toward the air conditioning unit.

Thus, the actuator for the inside/outside air switching damper is disposed on the side wall of the air blowing unit located toward the air conditioning unit, i.e., in a dead space between both the units, like the drive mechanisms and actuators for the air conditioning unit. This further reduces the size of the air conditioner, the number of processes for assembly of the units and the number of processes for attachment of the units to the vehicle body.

With a twenty-ninth solution according to claim 29 of the invention, in the vehicle air conditioner of any one of claims 1 to 28, the air conditioning unit is divided into upper and lower casings and the upper casing is divided into right and left parts, and the cooling heat exchanger and the heating heat exchanger are held sandwiched between the two divided parts of the upper casing.

With this configuration, the cooling and heating heat exchangers can be easily assembled and securely held. Furthermore, since no vertically separated surface is formed in the lower casing, this eliminates fear of leakage of condensate and provides ensured discharge of condensate through the drain port.

With a thirtieth solution according to claim 30 of the invention, in the vehicle air conditioner of claim 29, a dash panel forming a partition for separating the air conditioning unit from an engine room is provided at the side of the air conditioning unit located toward the front of the vehicle body, and the drain port is provided in a portion of the lower casing located toward the air blowing unit and toward the front of the vehicle body, the drain passage is extended from the drain port toward the air blowing unit substantially in parallel with the dash panel to protrude from the air conditioning unit, a drain pipe is connected to the exit of the drain passage, the drain pipe is extended in a direction orthogonal to the dash panel and inserted into an opening in the dash panel, and the drain passage is formed of an elongated groove part formed integrally with the lower casing, and a cover for the elongated groove part formed integrally with the upper casing.

With this configuration, the drain passage is formed not as a hollow body but as an elongated groove part in the lower casing, and a separate member covers the upper surface of the groove part. This enables integral formation of the drain passage with the lower casing and easy formation thereof even if the depth and length of the elongated groove are rather large, provides flexibility to the shape and size of the drain passage, ensures a space for storing condensate, and provides a configuration of the space that can discharge condensate smoothly.

A thirty-first solution according to claim 31 of the invention is directed to a vehicle air conditioner comprising: an air conditioning unit disposed substantially in the middle of the inside of an instrument panel in a widthwise direction of a vehicle; an air blowing unit disposed to a front-passenger's side of the air conditioning unit; an intermediate duct for ducting an air from the air blowing unit to the air conditioning unit; and a cooling heat exchanger and a heating heat exchanger disposed in the air conditioning unit, in which the air introduced from the intermediate duct into the air conditioning unit is allowed to pass through the cooling and heating heat exchangers disposed in the air conditioning unit to produce a conditioned air. Further, a drain port is provided in a bottom wall part of the air conditioning unit, the drain port is disposed in a portion of the bottom wall part located toward the front of the vehicle body and along a side wall of the air conditioning unit, and cooler pipes for the cooling heat exchanger are arranged along the same side wall that the drain port is located.

With this configuration, the drain port and the cooler pipes are disposed at the same side of the air conditioning unit. This facilitates the alignment and attachment work in attaching the air conditioning unit to the dash panel. Since the drain pipe connected to the drain port and the cooler pipes are arranged in proximity to each other, this makes the air conditioning unit more compact.

A thirty-second solution according to claim 32 of the invention is directed to a vehicle air conditioner comprising: an air conditioning unit disposed substantially in the middle of the inside of an instrument panel in a widthwise direction of a vehicle; an air blowing unit disposed to a front-passenger's side of the air conditioning unit; an intermediate duct for ducting an air from the air blowing unit to the air conditioning unit; and a cooling heat exchanger and a heating heat exchanger disposed in the air conditioning unit, in which the air introduced from the intermediate duct into the air conditioning unit is allowed to pass through the cooling and heating heat exchangers disposed in the air conditioning unit to produce a conditioned air. Further, a drain port is provided in a bottom wall part of the air conditioning unit, a drain passage connected integrally with the drain port is disposed to extend laterally of the air conditioning unit, a drain pipe is connected to the exit of the drain passage, and the drain pipe is disposed to extend into an engine room.

With this configuration, the drain passage is disposed to extend laterally from the projecting plane of the air conditioning unit as viewed in a vertical direction, and the drain pipe is connected to the exit of the drain passage. Therefore, there is no need for alignment of the opening of the dash panel and the drain port in a front to rear direction of the vehicle body, and their positional relationship can be set freely by changing the length of the drain passage, which provides great design flexibility.

Furthermore, since the drain passage can form a space for storing condensate, this reduces the amount of condensate stored in the bottom wall part and substantially eliminates involvement of condensate into the air flow being introduced into the cooling heat exchanger.

A thirty-third solution according to claim 33 of the invention is directed to a vehicle air conditioner comprising: an air conditioning unit disposed substantially in the middle of the inside of an instrument panel in a widthwise direction of a vehicle; an air blowing unit disposed to a front-passenger's side of the air conditioning unit; and an intermediate duct for ducting an air from the air blowing unit to the air conditioning unit, in which the air introduced from the intermediate duct into the air conditioning unit is allowed to pass through a cooling heat exchanger and a heating heat exchanger juxtaposed one above the other in the air conditioning unit to produce a conditioned air. Further, a drain port is provided in a bottom wall part of the air conditioning unit, the drain port is disposed in a portion of the bottom wall part located toward the front of the vehicle body and along a side wall of the air conditioning unit, and cooler pipes for the cooling heat exchanger are arranged along the same side wall that the drain port is located.

With this configuration, like the solution according to claim 31, the air conditioning unit can be easily attached to the dash panel and can be made more compact.

A thirty-fourth solution according to claim 34 of the invention is directed to a vehicle air conditioner comprising: an air conditioning unit disposed substantially in the middle of the inside of an instrument panel in a widthwise direction of a vehicle; an air blowing unit disposed to a front-passenger's side of the air conditioning unit; and an intermediate duct for ducting an air from the air blowing unit to the air conditioning unit, in which the air introduced from the intermediate duct into the air conditioning unit is allowed to pass through a cooling heat exchanger and a heating heat exchanger juxtaposed one above the other in the air conditioning unit to produce a conditioned air. Further, a drain port is provided in a bottom wall part of the air conditioning unit, a drain passage connected integrally with the drain port is disposed to extend laterally of the air conditioning unit, a drain pipe is connected to the exit of the drain passage, and the drain pipe is disposed to extend into an engine room.

This configuration, like the solution according to claim 32, provides significantly improved design flexibility to the drain port and the opening of the dash panel, and enables condensate to be stored in the drain passage to prevent roll-up of condensate.

With a thirty-fifth solution according to claim 35 of the invention, in the vehicle air conditioner of any one of claims 31 to 34, the side wall of the air conditioning unit at which the drain passage is disposed is at the side of the air conditioning unit located toward the air blowing unit. Therefore, the space between the air conditioning unit and the air blowing unit can be effectively used. Furthermore, a space located laterally from the air conditioning unit and opposite to the air blowing unit, i.e., a space on the driver's side of the air conditioning unit, can be obtained amply. Alternatively, a large-sized temperature-control duct can be provided on the driver's side wall of the air conditioning unit to effectively carry out the temperature control on the passenger's room.

With a thirty-sixth solution according to claim 36 of the invention, in the vehicle air conditioner of any one of claims 31 to 34, a bracket for supporting the cooler pipes is formed integrally with the air conditioning unit, and portions of the cooler pipes connected to the cooling heat exchanger, extended from the side wall of the air conditioner, bent substantially at a right angle and extended toward the front of the vehicle body are attached to the bracket. Therefore, the cooler pipes can be held stably at predetermined positions of the air conditioning unit.

With a thirty-seventh solution according to claim 37 of the invention, in the vehicle air conditioner of claim 36, the bracket is formed to be separated on vertical lines passing through the middles of the cooler pipes in their radial direction, and one separate piece of the bracket is formed integrally with the air conditioning unit, while the other separate piece is attached detachably to said one separate piece. This facilitates attachment and detachment of the cooler pipes and ensures alignment thereof.

With a thirty-eighth solution according to claim 38 of the invention, in the vehicle air conditioner of claim 36, openings for cooler pipes formed in the bracket have a diameter with a predetermined clearance left from the outer diameter of the cooler pipes, and the cooler pipes are fixed to the bracket by fitting a seal plate to the bracket, the seal plate being disposed detachably from the bracket. Therefore, in detaching the expansion valve connected to the cooling heat exchanger and presented laterally from the side wall of the air conditioning unit, the above structure provides slight freedom of movement for the cooler pipes. As a result, the expansion valve can be detached easily without removal of the bracket, which facilitates detachment work.

With a thirty-ninth solution according to claim 39 of the invention, in the vehicle air conditioner of claim 37, openings for cooler pipes formed in the bracket have a diameter with a predetermined clearance left from the outer diameter of the cooler pipes, and the cooler pipes are fixed to the bracket by fitting a seal plate to the bracket, the seal plate being disposed detachably from the bracket. Therefore, the same effects as in the solution according to claim 38 can be obtained.

With a fortieth solution according to claim 40 of the invention, in the vehicle air conditioner of claim 38, the seal plate has a groove corresponding to a cooler pipe, the groove has a width greater than the diameter of the cooler pipe and smaller than the diameter of the opening of the bracket, and the seal plate is detachable substantially at a right angle with respect to the cooler pipe. Therefore, the seal plate can stably secure the cooler pipe to the bracket.

With a forty-first solution according to claim 41 of the invention, in the vehicle air conditioner of claim 39, the seal plate has a groove corresponding to a cooler pipe, the groove has a width greater than the diameter of the cooler pipe and smaller than the diameter of the opening of the bracket, and the seal plate is detachable substantially at a right angle with respect to the cooler pipe. Therefore, the same effect as in the solution according to claim 40 can be obtained.

With a forty-second solution according to claim 42 of the invention, in the vehicle air conditioner of any one of claims 31 to 34, the drain port is disposed in a portion of the bottom wall part of the air conditioning unit located toward the front-passenger's seat and toward the front of the vehicle body, and the drain passage is disposed at the side wall of the air conditioning unit located toward the front-passenger's seat to extend from the air conditioning unit. In this manner, the drain port is open at a position that is not susceptible to the air flow sent from the intermediate duct to the air conditioning unit, and condensate is guided to the drain passage which is outside of the projecting plane of the air conditioning unit. This prevents condensate from being involved into the cooling heat exchanger.

With a forty-third solution according to claim 43 of the invention, in the vehicle air conditioner of claim 42, the bottom wall part of the air conditioning unit has an inclined surface that is lowest in level at the drain port, is highest in level at the corner diagonally opposite to the drain port and is thus gradually downwardly inclined from the diagonally opposite corner toward the drain port, and the drain passage is also inclined downwardly from the drain port toward the exit of the drain passage. Therefore, condensate can be promptly collected to the drain port and guided to the exit of the drain passage.

BRIEF DESCRIPTION OF DRAWINGS

FIG. 24 illustrates how an expansion valve box is attached to a casing.

BEST MODE FOR CARRYING OUT THE INVENTION

Preferred embodiments of the present invention will be described below with reference to the drawings.

Figure 1:
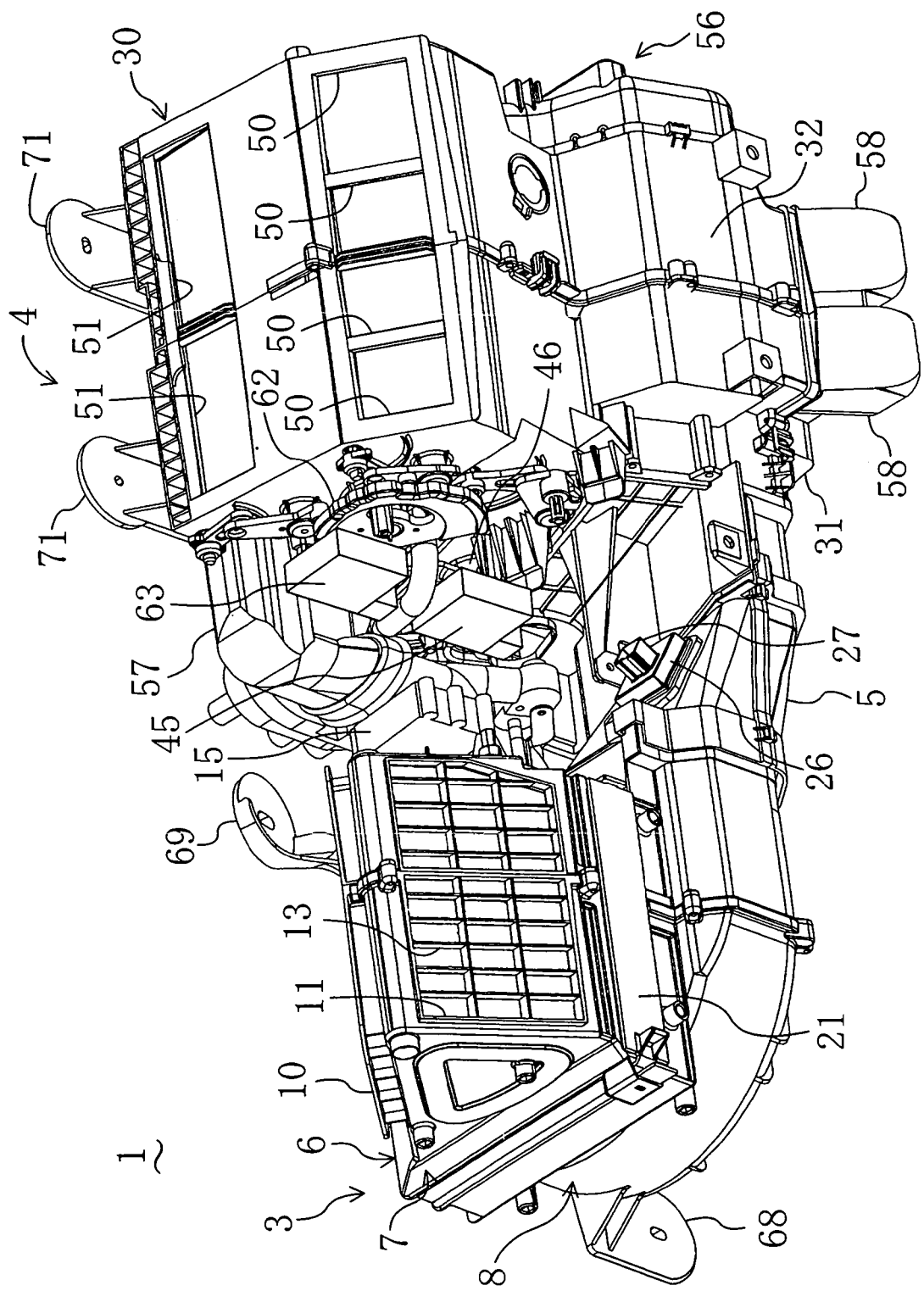
FIG. 1 is a perspective view in appearance of an air conditioner according to an embodiment of the present invention as seen from the left rear.
Figure 2:
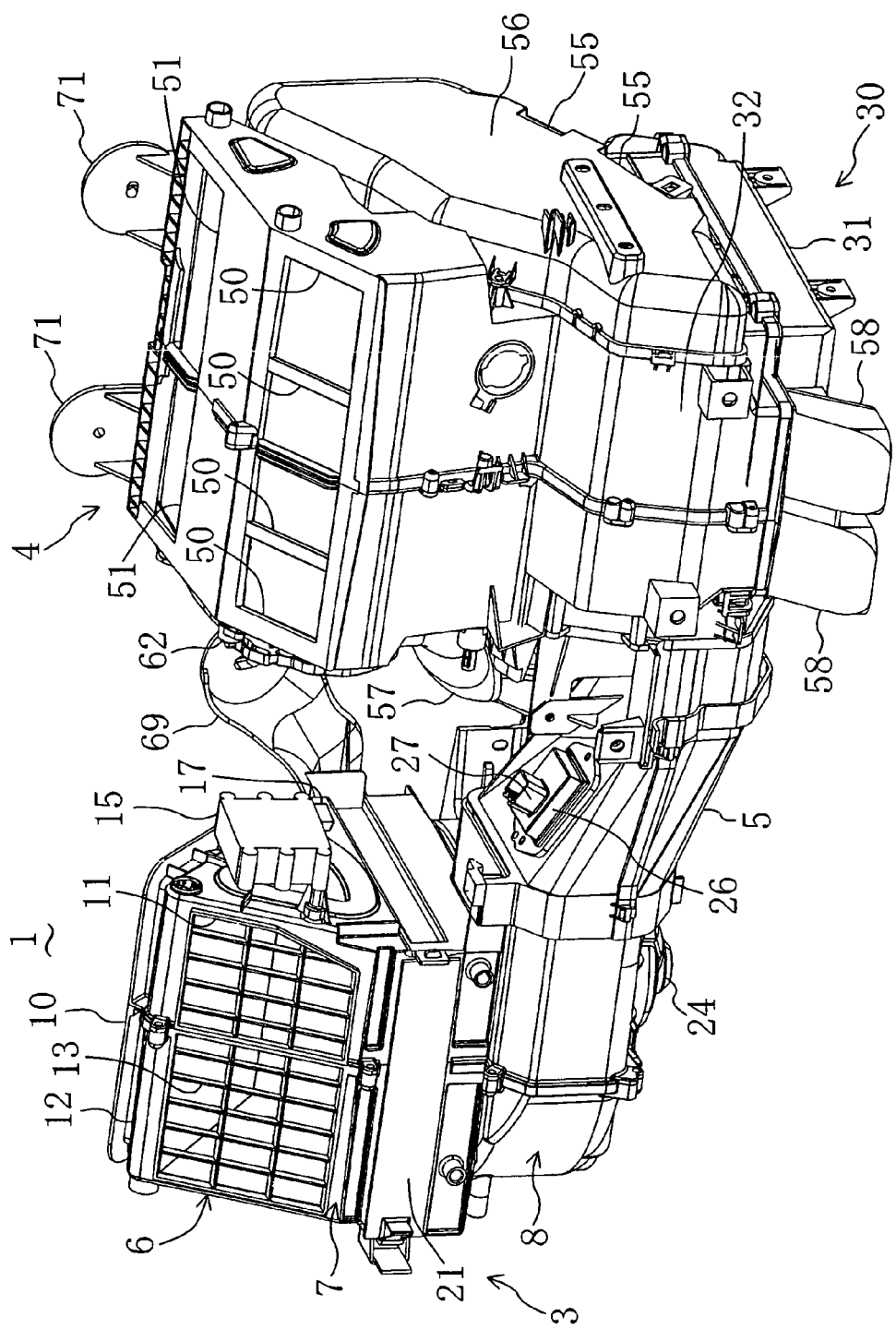
FIG. 2 is a perspective view in appearance of the air conditioner as seen from the right rear.
Figure 3:
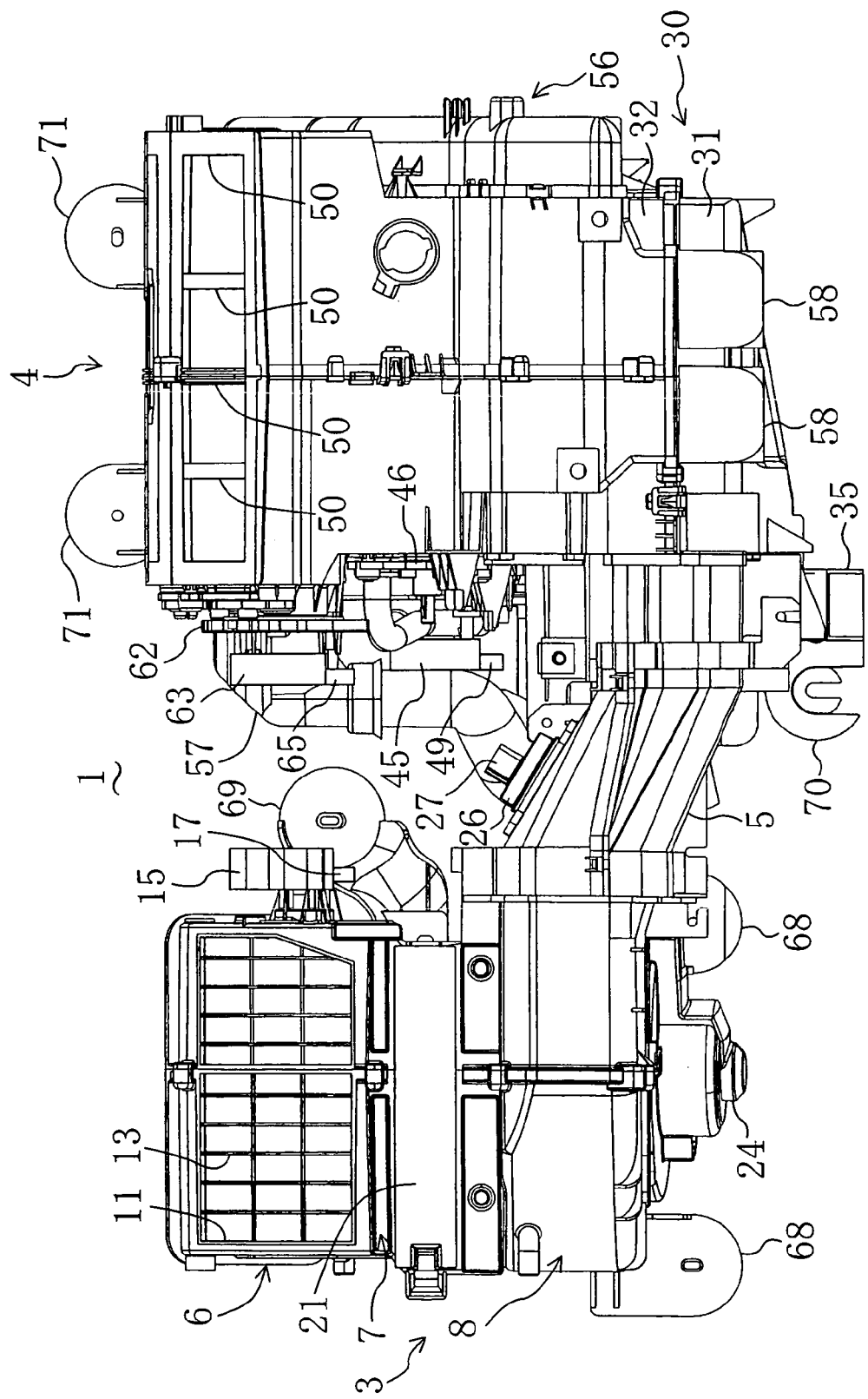
FIG. 3 is a rear view in appearance of the air conditioner.
Figure 4:
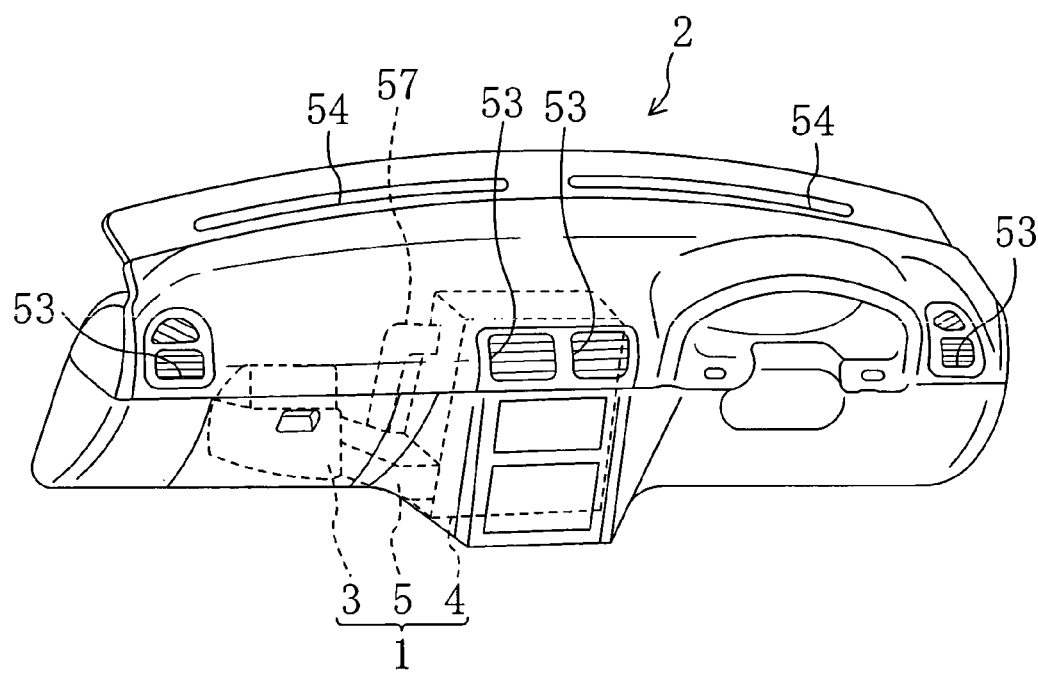
FIG. 4 is an illustration of how the air conditioner is disposed in a vehicle.
Figure 6:
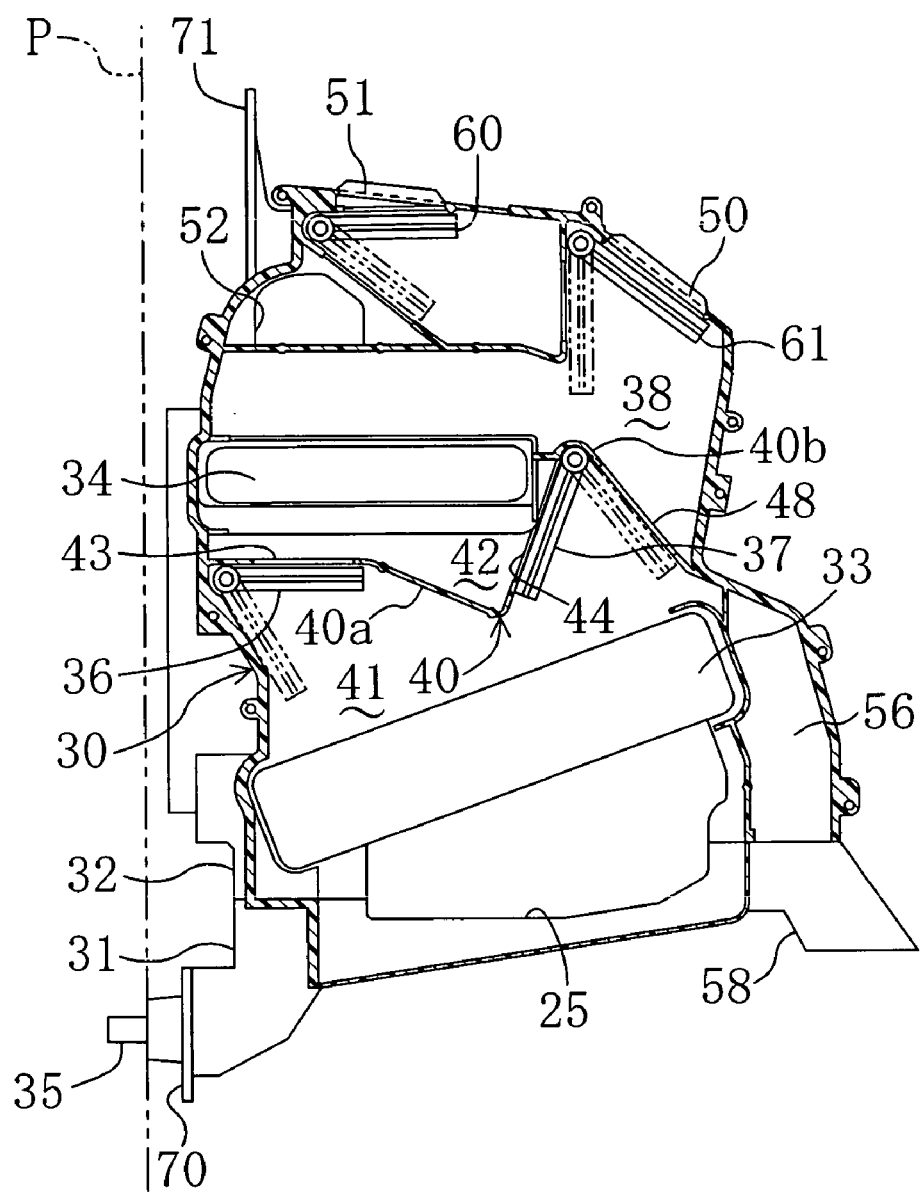
FIG. 6 is a sectional view of an air conditioning unit showing its internal structure.
Figure 10:
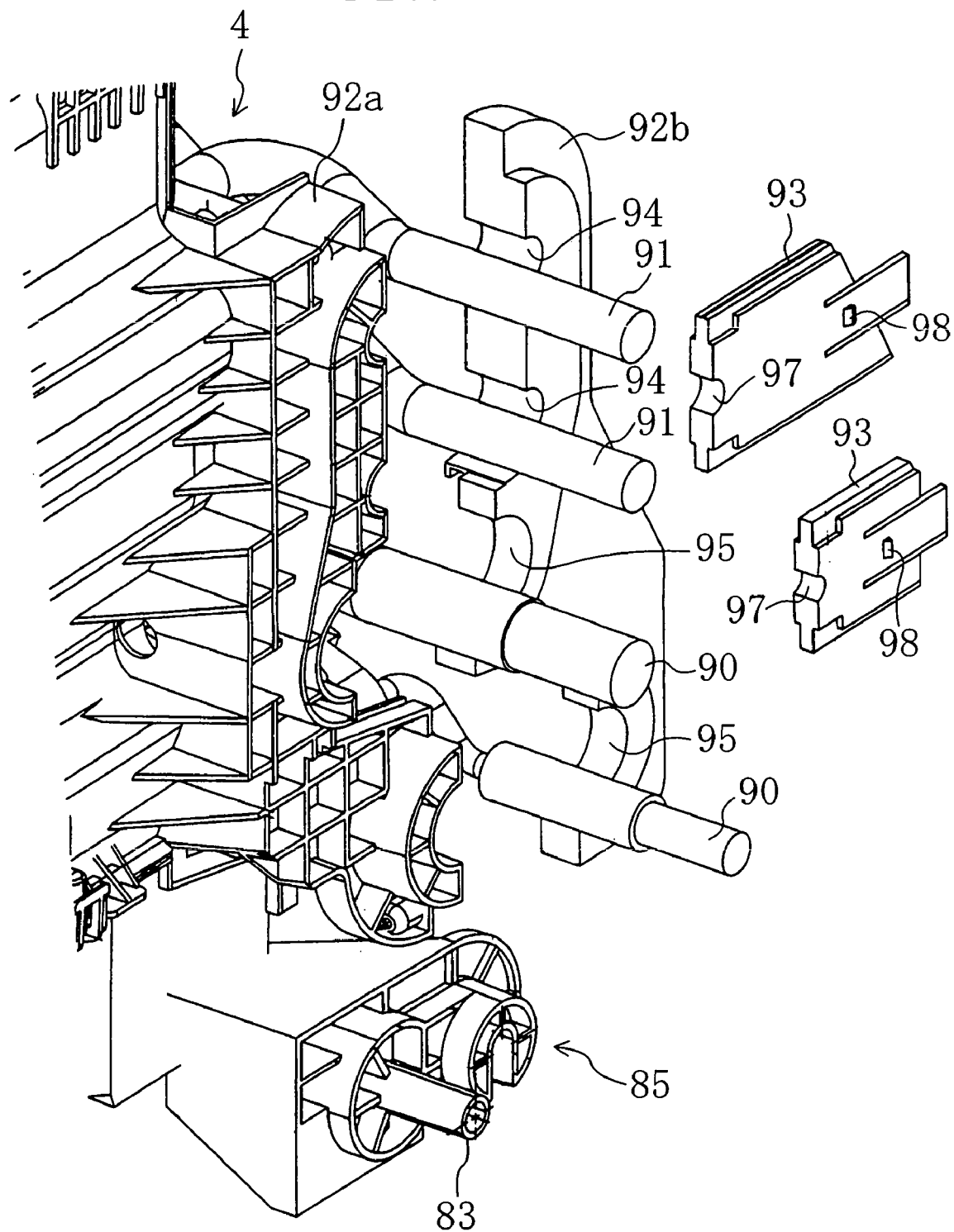
FIG. 10 illustrates how heater pipes and cooler pipes are attached to the air conditioning unit.
Figure 11:
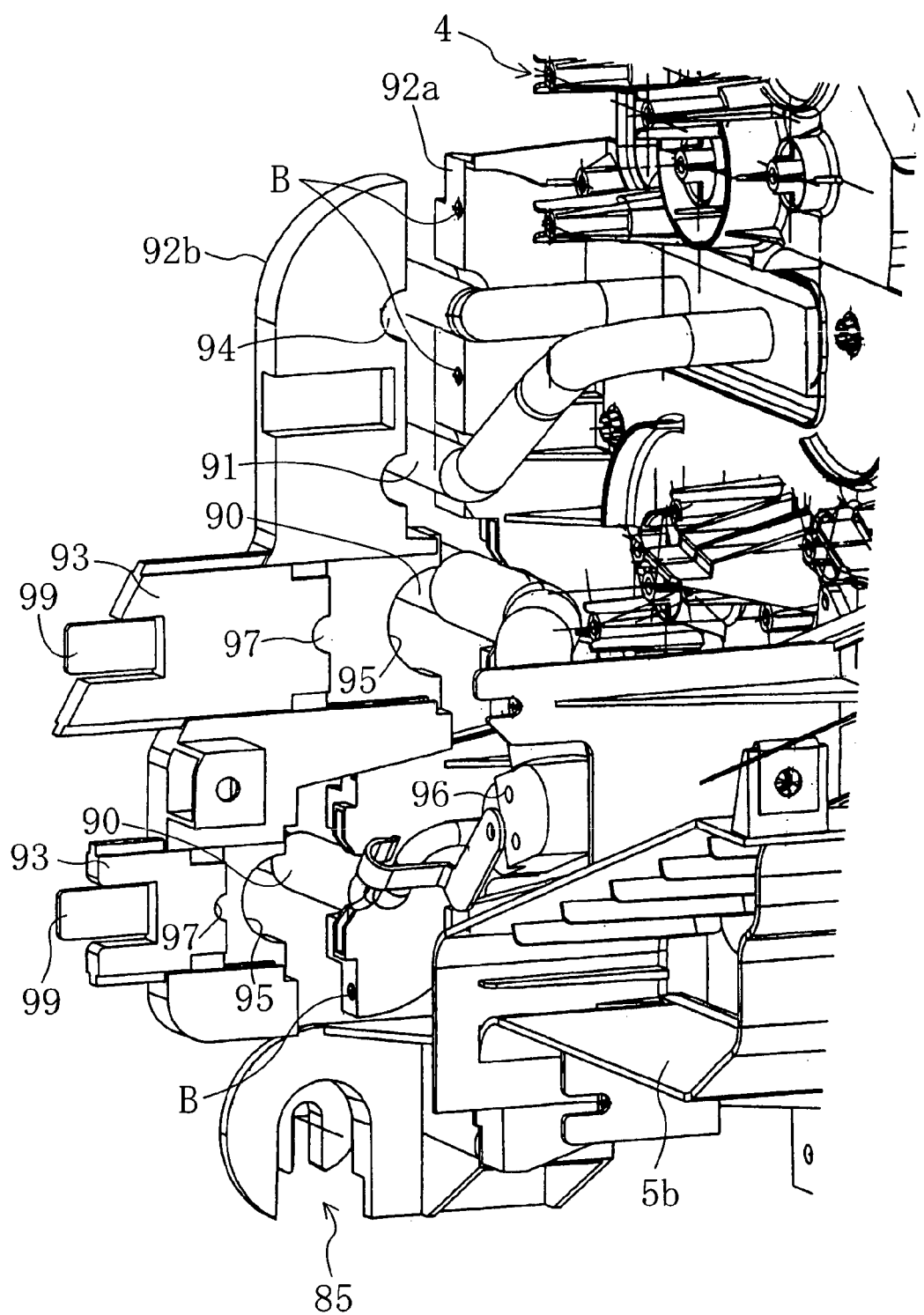
FIG. 11 is a view of the attachment of the heater and cooler pipes of FIG. 8 as seen from the opposite direction.

FIGS. 1 to 3 shows the appearance of an air conditioner 1 according to a preferred embodiment of the present invention. This air conditioner 1 is housed inside of an instrument panel 2 disposed in a passenger's room of a car, as shown in FIG. 4. This car is a so-called right-hand drive car in which a driver's seat and a front passenger's seat are located at the right and left sides of the vehicle body, respectively. A dash panel P (as shown in FIGS. 6 and 10) separates an engine room located at the front of the vehicle body from the front side of the passenger's room. It should be noted herein that the vehicle body front and vehicle body rear of the air conditioner 1 are referred to as the front and rear of the air conditioner 1.

As shown in FIG. 3, the air conditioner 1 essentially consists of an air blowing unit 3, an air conditioning unit 4 for cooling an air from the air blowing unit 3, controlling the temperature of the air and then supplying the air to the passenger's room, and an intermediate duct 5 through which the air from the blowing unit 3 is sent to the air conditioning unit 4. The air conditioning unit 4 is disposed substantially in the widthwise middle of the car, while the air blowing unit 3 is disposed a predetermined distance leftward away from the air conditioning unit 4 and to the front of the front passenger's seat. The bottom end of the air blowing unit 3 is located at an upper level than the bottom end of the air conditioning unit 4 to ensure an ampler legroom for the front-seat passenger.

The air blowing unit 3 includes a casing 6 divided into right and left parts substantially at the car widthwise middle, and the two parts are integrated into a single piece using a fastener or the like. The upper portion of the casing 6 includes an air intake part 7 for taking an air into the air conditioner 1. The lower portion of the casing 6 includes an air blowing part 8 for sending the intake air to the air conditioning unit 4. The upper portion of the air intake part 7 is formed with an outside air intake 10 through which an air outside of the passenger's room is taken in via a duct (not shown), and an inside air intake 11 through which an air inside of the passenger's room is taken in. Further, inside of the air intake part 7, an inside/outside air switching damper 12 is provided to make one of the inside and outside air intakes 10 and 11 open and the other closed.

More specifically, the upper portion of the air intake part 7 has a front wall of rectangular shape that inclines toward the rear of the vehicle body in proceeding to the top and a rear wall of rectangular shape that inclines toward the front of the vehicle body in proceeding to the top. The front and rear walls are continuous at their upper edges so that the upper portion of the air intake part 7 has an approximately triangular section when viewed in the car widthwise direction. The front and rear walls have the outside and inside air intakes 10 and 11 opened in rectangular shape, respectively. Each air intake is formed integrally with a grille 13. The side walls of the air intake part 7 connect the corresponding side edges of the front and rear walls. The inside/outside air switching damper 12 is of rectangular shape larger than each of the air intakes 10 and 11, and has a shaft that is located at its upper edge and extends in the car widthwise direction. Both ends of the shaft are supported to the upper ends of the pair of side walls of the air intake part 7.

The lower end of the inside/outside air switching damper 12 is provided with a connecting part (not shown) passing through one of the side walls of the air intake part 7 so as to be connected with an output shaft of an actuator 15 attached to that side wall of the air intake part 7. This side wall is formed integrally with a boss to which the actuator 15 is fastened with screws. The actuator 15 operates in response to a signal from an air conditioning controller (not shown) disposed in the vehicle body. A signal line from the air conditioning controller is connected with a coupler 17 for the actuator 15.

When the actuator 15 angularly moves the inside/outside air switching damper 12 about the shaft to the position that the outside air intake 10 is fully open, the inside air intake 11 is fully closed. Thus, the air blowing unit 3 enters an outside air intake mode in which only an outside air is taken in the unit. On the other hand, when the actuator 15 angularly moves the inside/outside air switching damper 12 oppositely from that position to the position that the outside air intake 10 is fully closed, the inside air intake 11 is fully open. Thus, the air blowing unit 3 enters an inside air circulation mode.

Figure 5:
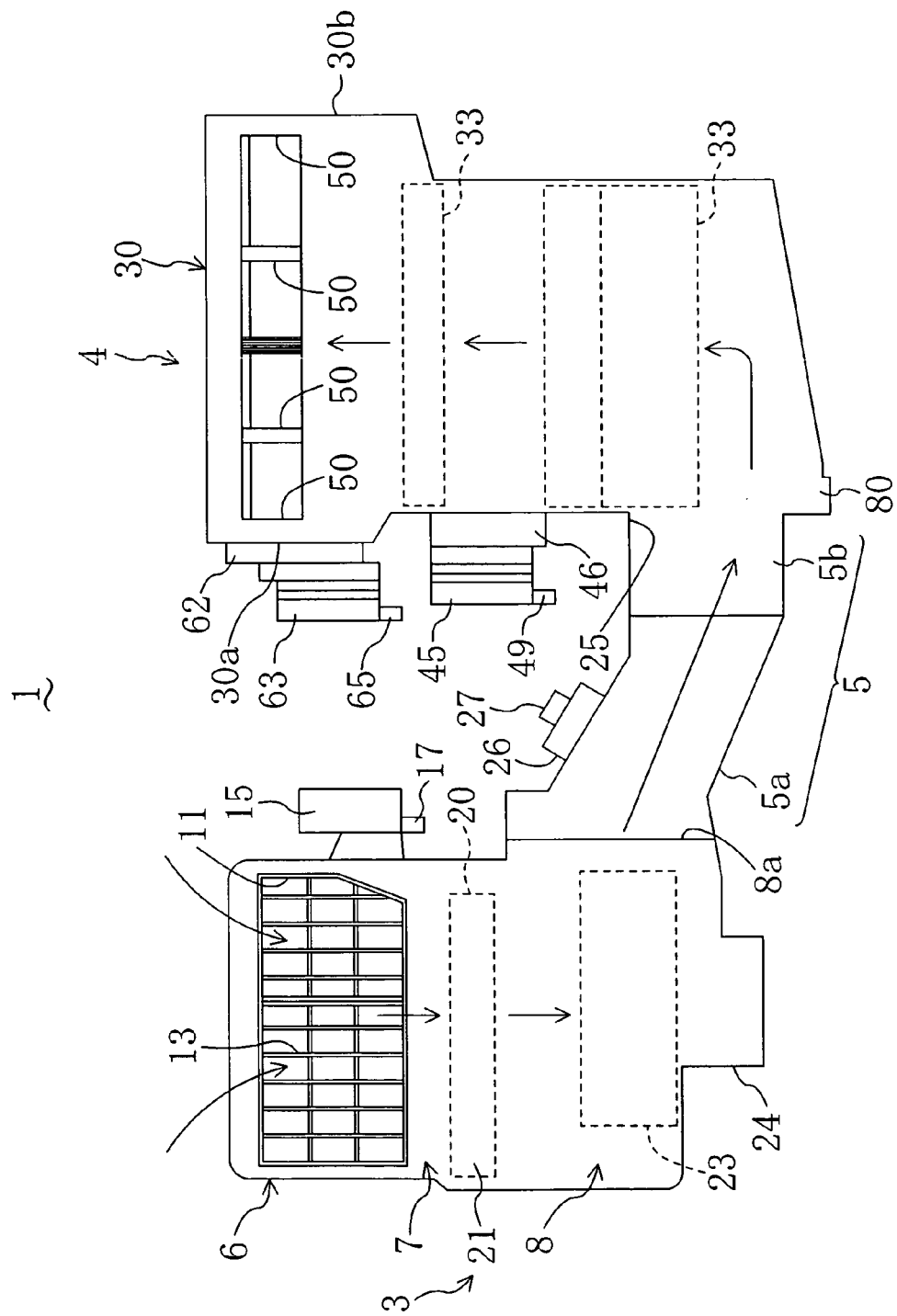
FIG. 5 schematically illustrates the structure of the air conditioner and corresponds to FIG. 3.

As shown in FIG. 5, the lower portion of the air intake part 7 is provided with a filter accommodation part 21 for accommodating a filter 20 for filtering the intake air. Although not shown, an opening is formed in a portion of the casing 6 located to the rear side of the filter accommodation part 21, which enables the filter 20 to be replaced with new one through the opening. The air blowing part 8 is located under the filter accommodation part 21. In the air blowing part 8, a centrifugal multi-blade fan is placed as an air blowing fan 23 to extend its rotating shaft vertically, and a fan-driving motor 24 is disposed below the air blowing fan 23. As shown in the arrows in FIG. 5, the rotation of the air blowing fan 23 causes air to be taken in from above the air intake part 7, to pass through the filter 20 and to be introduced into the air blowing part 8.

The right wall of the air blowing part 8 is formed with an opening 8a and is connected at the opening 8a to the left end of the intermediate duct 5. The air blowing and air conditioning units 3 and 4 are located away from each other by a distance between both ends of the intermediate duct 5. As shown in the arrow in FIG. 5, the air from the air blowing unit 3 is smoothly sent into the air conditioning unit 4 by passing through the intermediate duct 5.

As shown in FIG. 5 again, the intermediate duct 5 has an inclined duct 5a and a horizontal duct 5b. The inclined duct 5a is formed to obliquely downwardly extend from the left end of the intermediate duct 5 toward the bottom end of the air conditioning unit 4. The horizontal duct 5b is communicated at its right end with the inside of the air conditioning unit 4 through an opening 25 formed at the bottom end side of a casing 30 for the air conditioning unit 4.

Figure 18:
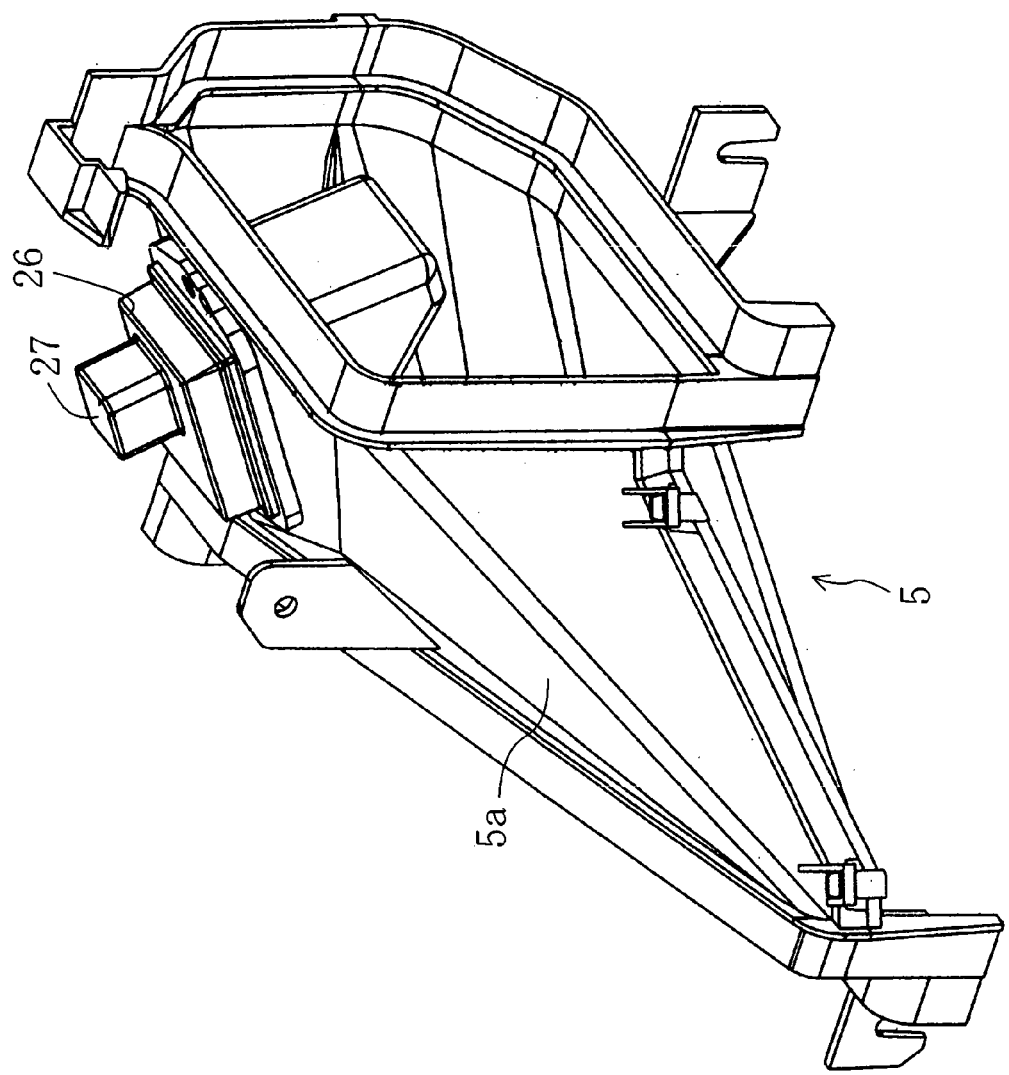
FIG. 18 is a perspective view of an intermediate duct.
Figure 19:
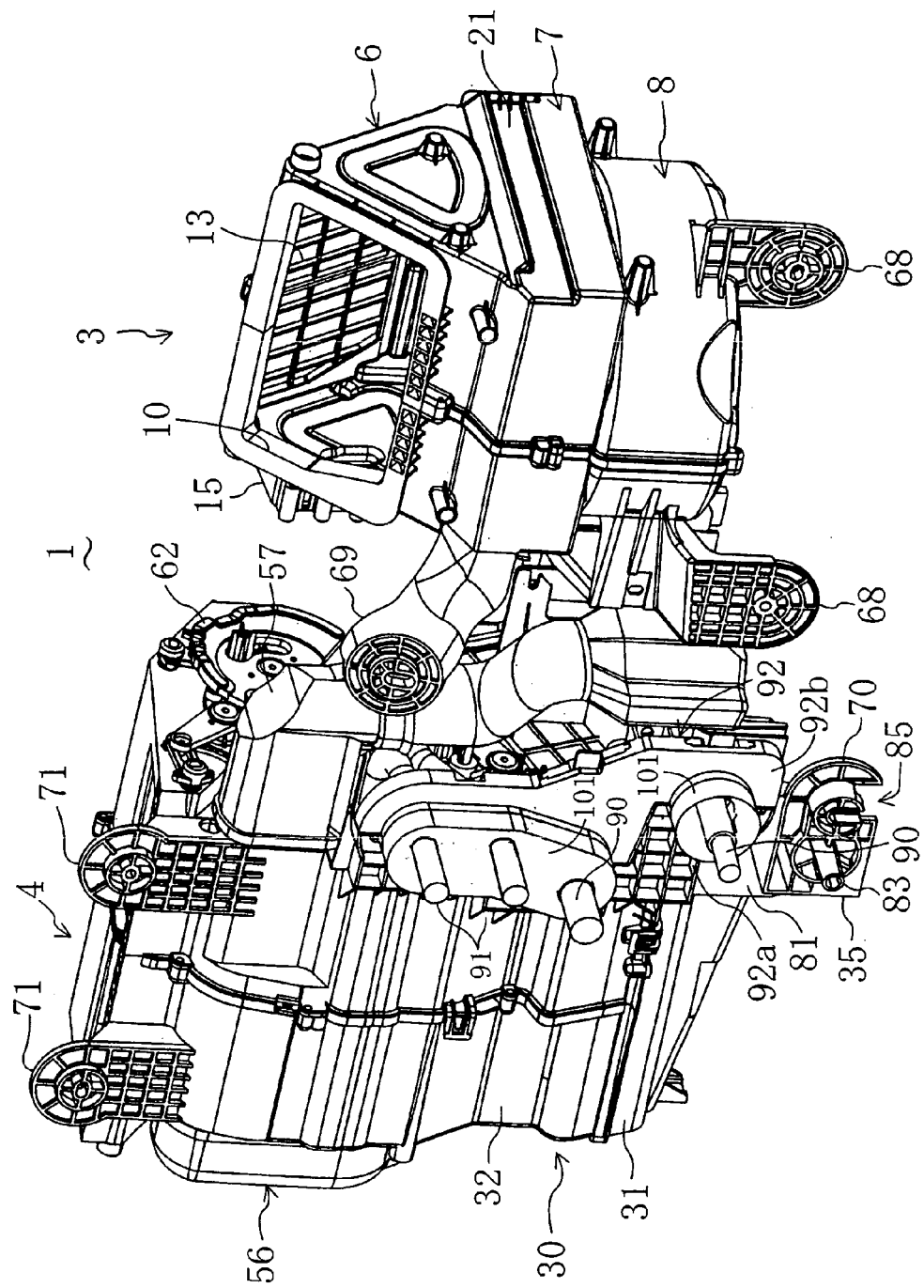
FIG. 19 is a perspective view of an air conditioner for a left-hand drive car.
Figure 20:
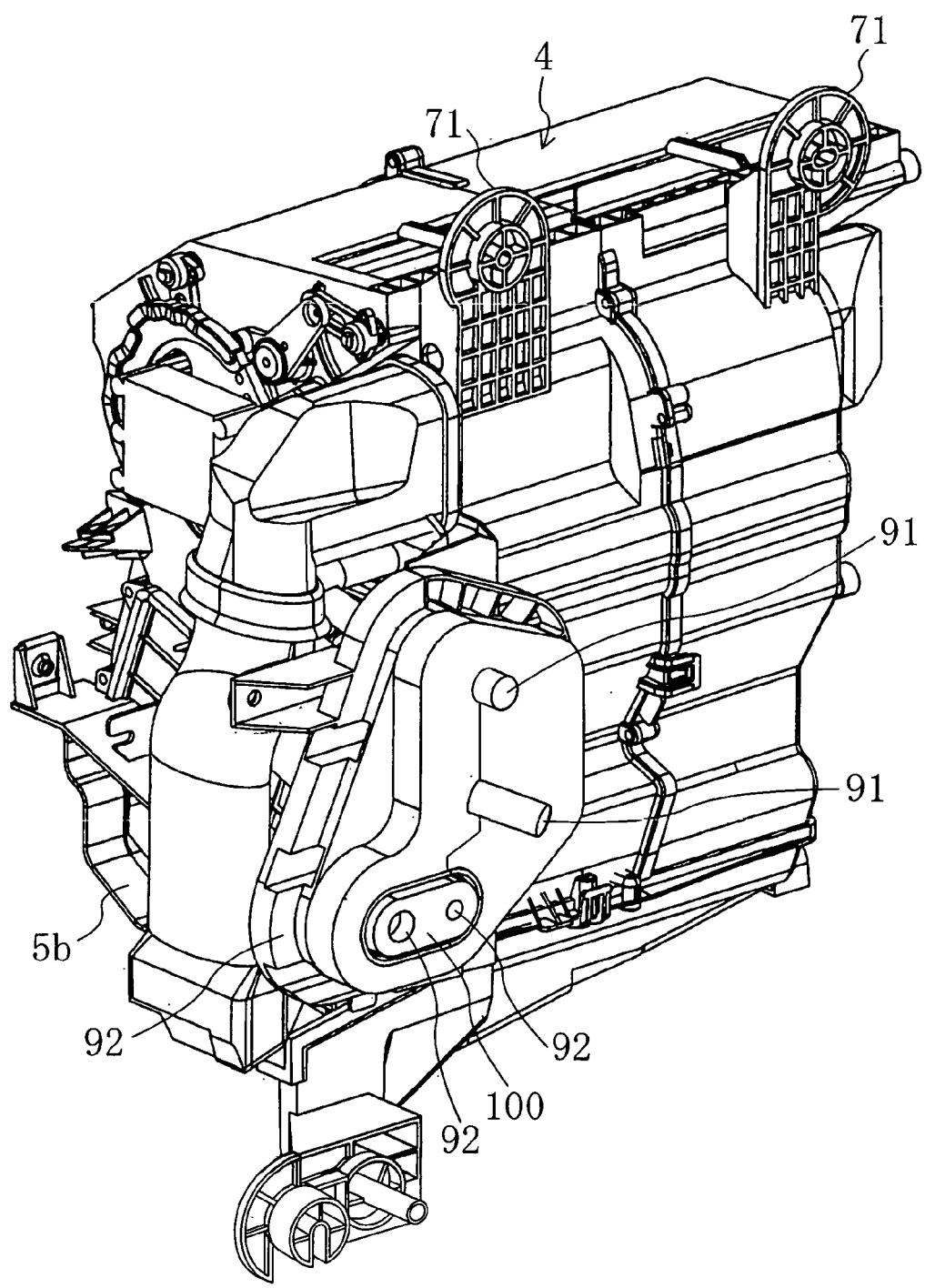
FIG. 20 is a perspective view of an air conditioning unit of the air conditioner of FIG. 19.
Figure 21:
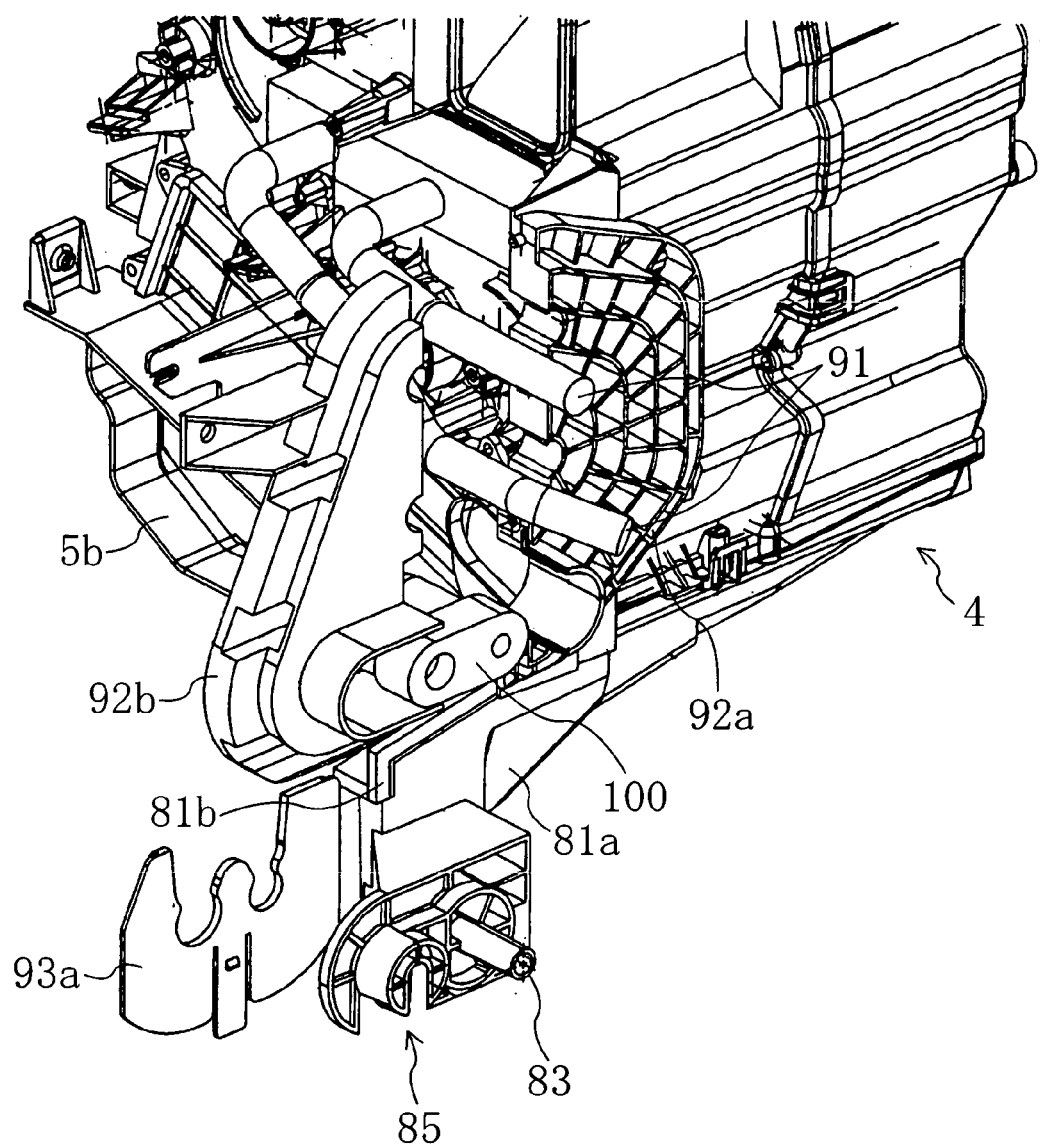
FIG. 21 is a partly enlarged view of a bracket of the air conditioning unit of FIG. 20 and illustrates how the heater pipes and cooler pipes are attached to the bracket.

As shown in FIG. 18, the inclined duct 5a is formed to have an approximately rectangular section at its left end and an approximately triangular section at its right end and smoothly change its cross-sectional shape from rectangle to triangle thereby reducing air turbulence and air resistance. The horizontal duct 5b continues to have an approximately triangular section and is internally provided with a plurality of projections to straighten the air flow. The horizontal duct 5b and the opening 25 of the casing 30 are connected at their similar triangular sections with each other.

In particular, a high-speed air in the radially outer side (the vehicle body rear side) of the air blowing unit 3 is sent to a wider area side (the vehicle body rear side) of the opening 25 of substantially triangular shape, while a low-speed air in the radially inner side (the vehicle body front side) of the air blowing unit 3 is sent to a narrower area side (the vehicle body front side) of the opening 25 of substantially triangular shape.

As shown in FIG. 2, the intermediate duct 5 is provided at its top wall with a control circuit 26 for changing the rpm of the fan-driving motor 24. The control circuit 26 is provided at its top with a coupler 27 to which a connector from the air conditioning controller is connected.

The air conditioning unit 4 has the casing 30 which is generally vertically elongated and formed in a rectangular box of larger size than that of the casing 6 for the air blowing unit 3. The casing 30 is divided into a bottom wall part 31 and a body part 32 one above the other; the bottom wall part 31 forms a lower casing and the body part 32 forms an upper casing. Further, the body part 32 is divided into two portions substantially at the middle in the widthwise direction of the car, like the air blowing unit 3.

As shown in FIG. 6, inside of the casing 30, an evaporator 33 as an element of a refrigeration cycle is placed above the opening 25 at which the casing 30 is connected to the intermediate duct 5, and a heater core 34 is placed above the evaporator 33. The upper portion of the casing 30 is formed with a plurality of air outlets for a conditioned air. As shown in the arrows in FIG. 5, the air flow from the air blowing unit 3 turns an upward flow in the air conditioning unit 4.

Figure 7:
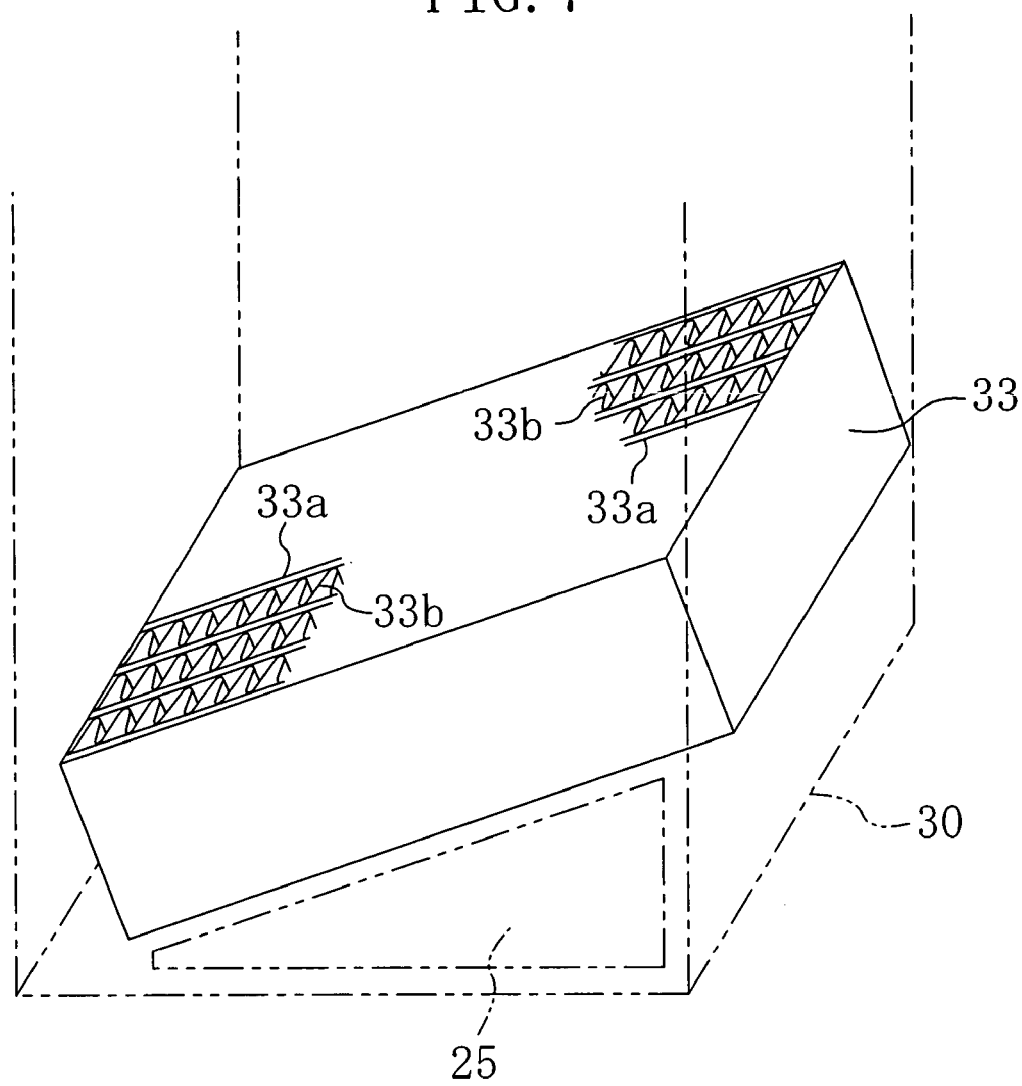
FIG. 7 is an illustration of how an evaporator is disposed.
Figure 8:
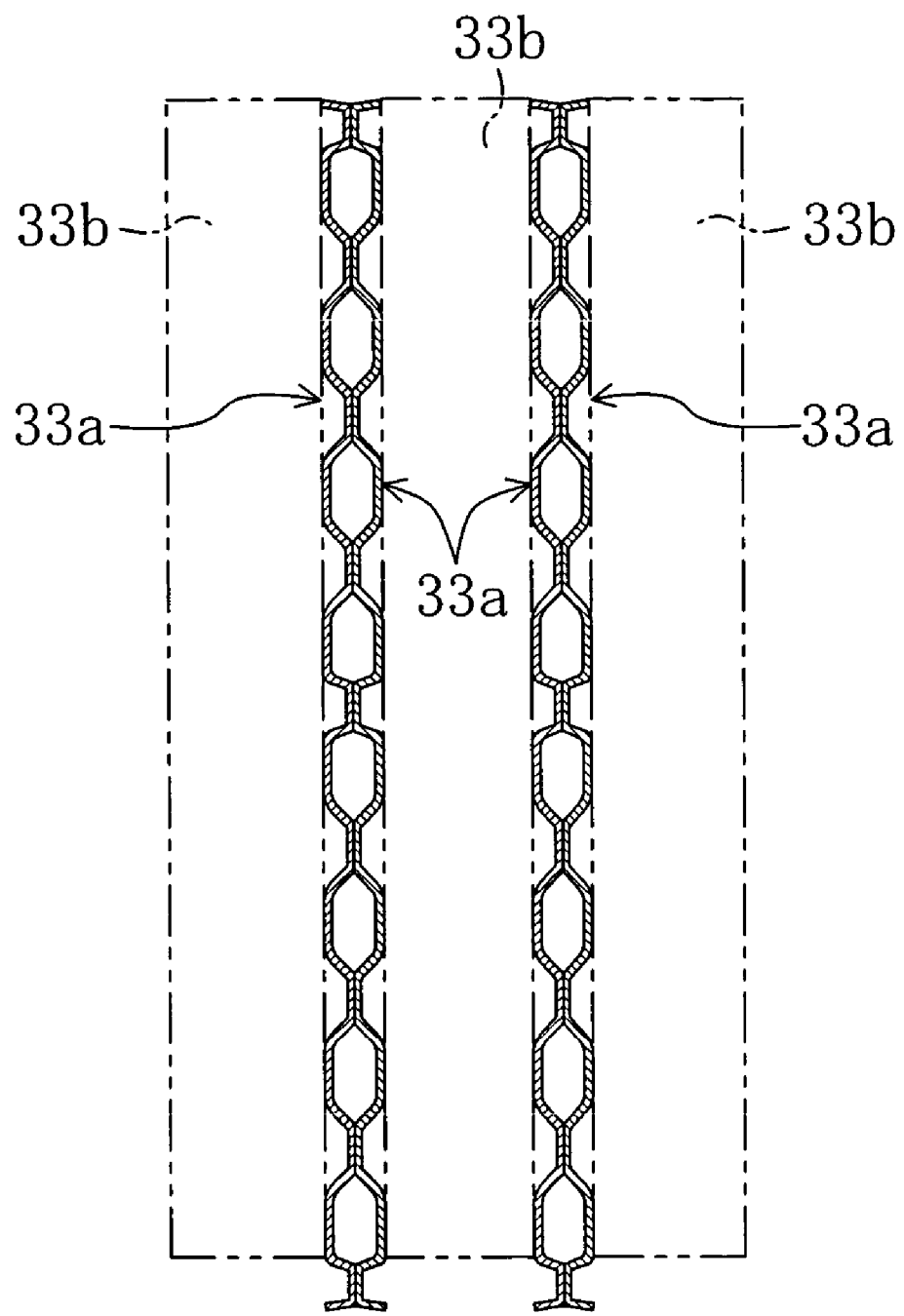
FIG. 8 shows sectional configurations of flat tubes and corrugate fins in the evaporator of FIG. 7.
Figure 9:
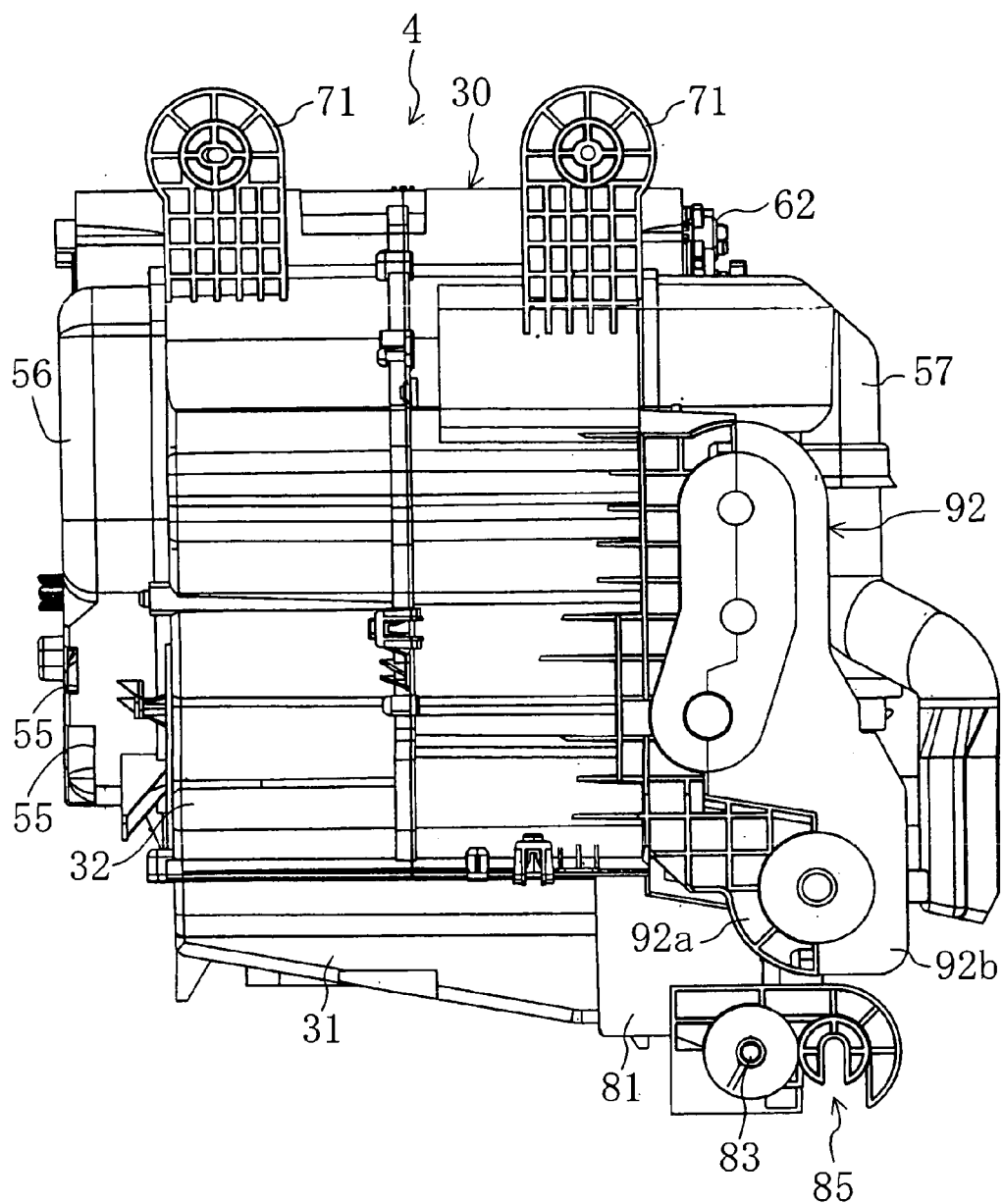
FIG. 9 is a front view in appearance of the air conditioning unit.

The evaporator 33 is a cooling heat exchanger for cooling the air from the air blowing unit 3. The evaporator 33 is formed by stacking multiple flat tubes 33a, each made of a thin metal plate such as an aluminum plate, in parallel and interposing a corrugate fin 33b made of a thin metal plate between the adjacent flat tubes 33a. As shown in FIGS. 7 and 8, the flat tube 33a is a hollow body formed by superposing halved containers one on another in opposed relation to extend in a rear to front direction of the vehicle body. The corrugate fin 33b interposed between the flat tubes 33a is formed to have a wave shape when viewed from above. The bottom end of the corrugate tube 33b is located above the bottom ends of the adjacent flat tubes 33a. In other words, the bottom ends of the flat tubes 33a are located below the bottom ends of the corrugate fins 33b. Therefore, a space between the bottom ends of the adjacent flat tubes 33a functions as a space for guiding condensate falling from the corrugate fin 33b down to the bottom end surface of the flat tube 33a in a rear to front direction of the vehicle body.

The flat tubes 33a of the evaporator 33 are constructed so that a low-temperature refrigerant produced by refrigeration cycle circulates therein to cool the air passing upwardly through the evaporator 33. Specifically, although not shown, tanks are provided at both sides of the evaporator 33 adjacent to both ends of all the flat tubes 33a to communicate with the tubes. One of the tanks is divided into an inflow tank section and an outflow tank section by a partition plate disposed at the middle thereof in a stacking direction of the flat tubes 33a. The refrigerant flowing into the inflow tank section flows into the other tank through upstream tubes connected to the inflow tank section, and then flows into the outflow tank section of said one tank through downstream tubes.

The evaporator 33 is placed to extend the tubes in the car lengthwise direction and to locate portion thereof closer to the rear of the car at higher level, thereby passing all the air from the air blowing unit 3 through the evaporator 33. The inflow and outflow tank sections of the evaporator 33 are connected with corresponding cooler pipes 90. Each cooler pipe 90 is provided so as to be extended outwardly from a left side wall 30a (shown in FIG. 5) of the casing 30 for the air conditioning unit 4, bent substantially at a right angle and then extended toward the front of the vehicle body.

The heater core 34 is horizontally placed above the evaporator 33 to apply heat to the air from the evaporator 33. The heater core 34 is connected with heater pipes 91 including introduction and discharge pipes for a high-temperature engine cooling water. Each heater pipe 91 is provided so as to be extended outwardly from the left side wall 30a (shown in FIG. 5) of the casing 30 for the air conditioning unit 4, bent substantially at a right angle, and then extended toward the front of the vehicle body. The heater pipes 91 and cooler pipes 90 are supported to the air conditioning unit 4 by a bracket 92.

Next, description will be made about the bracket 92 and its surroundings with reference to FIGS. 9 to 12. The heater pipes 91 are juxtaposed one above the other. One of the cooler pipes 90 is arranged immediately below the heater pipe 91, while the other is arranged below said one cooler pipe 90 and slightly off to the side. The bracket 92 includes a fixed bracket 92a integrally formed with the casing 30 in the air conditioning unit 4 and a detachable bracket 92b. The vertical plane that divides the bracket 92 into the fixed and detachable brackets 92a and 92b runs through the vertical center lines of the heater tubes 91 and the cooler tubes 90.

The fixed and detachable brackets 92a and 92b of the bracket 92 have recesses corresponding to arcs obtained by halving the heater pipes 91 and cooler pipes 90, and the recesses form openings 94 and 95 for the heater pipes 91 and cooler pipes 90 when both the brackets 92a and 92b are abutted on each other. The diameter of the opening 94 for the heater pipe 91 is substantially equal to the outer diameter of the heater pipe 91. Therefore, when the detachable bracket 92b is attached to the fixed bracket 92a, the heater pipes 91 can be fixed in the openings 94.

On the other hand, the opening 95 for the cooler pipe 90 is formed with a predetermined clearance left from the outer diameter of the cooler pipe 90. In this manner, when the detachable bracket 92b is attached to the fixed bracket 92a, the cooler pipes 90 can be moved slightly. Therefore, at the attachment and detachment of an expansion valve box 96 for the evaporator 33 to and from the left side wall 30a of the casing 30, the expansion valve box 96 can be attached and detached, without removal of the evaporator 33 from the casing 30, by slightly moving the cooler pipe 90.

To support the cooler pipes 90 to the bracket 92, seal plates 93 are provided. Each seal plate 93 has a half-round recess 97 of corresponding diameter to the outer diameter of the cooler pipe 90, and is laterally slidable by being guided in an elongated groove provided in the detachable bracket 92b. The cooler pipe 90 can be fixed to the bracket 92 by inserting the corresponding seal plate 93 to a predetermined position of the detachable bracket 92b. When the seal plate 93 is inserted in the groove to the predetermined position, a lug 98 on a plate 99 integrally formed with the seal plate 93 is fitted into a recess (not shown) of the detachable bracket 92b. On the other hand, in slidingly pulling the seal plate 93 out of the groove, the plate 99 need only be pinched to disengage the lug 98 from the recess and in this state, slid out of the groove. Thus, the seal plate 93 can be easily inserted into and pulled out of the groove.

It will be understood that the detachable bracket 92b can be attached to the fixed bracket 92a by screw fixation B in the same direction as with its assembly.

In this embodiment, the seal plates 93 are provided individually for the cooler pipes 90. However, a single seal plate may be provided for both the cooler pipes 90. Further, seal plates may also be provided for the heater pipes 91 and a drain pipe 83 to fix them.

Next, description will be made about a structure for discharging condensate in the air conditioning unit 4. Condensate produced in the evaporator 33 during air cooling is discharged outside through a drain 35 provided in the bottom wall part 31 of the casing 30. As shown in FIGS. 13 to 17, the drain 35 includes a drain port 80 and a drain passage 81 formed at the front-end left corner (the air blowing unit side) of the bottom wall part 31. The drain port 80 is formed integrally with the bottom wall part 31, and the drain passage 81 is formed integrally with the drain port 80. The drain passage 81 extends from the drain port 80 toward the air blowing unit substantially in parallel with the dash panel.

The exit 82 of the drain passage 81 extends beyond the left side wall 30a of the casing 30 in the air conditioning unit 4 leftward (toward the air blowing unit). The exit 82 is connected with the drain pipe 83 substantially at a right angle. The end of the drain pipe 83 is inserted into a through hole 102 in the dash panel P.

The bottom wall part 31 has an inclined surface that is lowest in level at the drain port 80, is highest in level at the corner diagonally opposite to the drain port 80 and is thus gradually downwardly inclined from the diagonally opposite corner toward the drain port 80. The drain passage 81 is also inclined downwardly from the drain port 80 toward the exit 82. Such a configuration guides condensate stored in the bottom wall part 31 to flow toward the drain port 80, then flow toward the exit 82 through the drain passage 81, and then flow out of the passenger's room through the drain pipe 83.

Particularly, the inclined surface of the bottom wall part 31 of the casing 30 is branched into two and then merged at the left end of the bottom wall part 31 so that the left end is located at a lower level with respect to the right end of the horizontal duct 5b. With this configuration, even if a moving vehicle tilts on the front passenger's side, condensate stored in the bottom wall part 31 can be prevented from flowing back to the air blowing unit through the intermediated duct 5.

The intermediate duct 5 is connected with the air blowing unit 3 and, as shown in FIG. 5, has an inclined duct 5a and a horizontal duct 5b. The inclined duct 5a is inclined obliquely downward from the air blowing unit 3 toward the air conditioning unit 4. The horizontal duct 5b communicates the inclined duct 5a with the casing 30 of the air conditioning unit 4. The inclined duct 5a is formed separately from the horizontal duct 5b, while the horizontal duct 5b is formed integrally with the casing 30. Specifically, the lower half of the horizontal duct 5b is formed integrally with the bottom wall part 31, while the upper half thereof is formed integrally with the body part 32.

As shown in FIG. 18, the inclined duct 5a is formed to have an approximately rectangular section at a connected portion with the opening 8a of the air blowing part 8 in the air blowing unit 3 and an approximately triangular section at a connected portion with the horizontal duct 5b. In the inclined duct 5a, the air flows while smoothly changing its flow direction from the condition that it flows through the rectangular sectional area to the condition that it flows through the triangular sectional area.

In this embodiment, since the horizontal duct 5b is formed integrally with the casing 30 but separately from the inclined duct 5a, the inclined duct 5a can be easily designed and formed so that the air smoothly flows therein.

When the air flow is sent from the inclined duct 5a directly into an introduction part 39 of the casing 30, the downwardly inclined air flow will collide with the bottom wall part 31 to disturb or roll up condensate in the bottom wall part 31. To cope with this, the horizontal duct 5b is provided immediately before the introduction part 39 in this invention. Thus, the air flow that is sent obliquely downwardly from the air blowing unit 3 through the inclined duct 5a is slightly changed substantially horizontally by the horizontal duct 5b so as to be guided into the lower space 39 located below the evaporator 33 through the opening 25 of the air conditioning unit 4. This suppresses the air flow directing obliquely downwardly in the lower space 39, minimizes the collision of the air flow with the bottom wall part 31, and prevents the roll-up of the condensate flowing in the bottom wall part 31.

Particularly, the middle of the bottom wall part 31 is formed with a flat surface portion 31a which is substantially parallel with the horizontal duct 5b. With such a configuration, the air from the intermediate duct 5 flows along the flat surface portion 31a in the lower space 39 and is changed in flow direction toward the evaporator 33 located above the flat surface portion 31a. This effectively avoids the collision of the air flow coming into the lower space 39 with the condensate flow on the inclined surface of the bottom wall part 31 toward the drain port 80, and significantly reduces the interference of the air flow with the condensate flow.

Further, the air from the air blowing unit 3 to the opening 25 through the intermediate duct 5 is sent from the inclined duct 5a into the lower space 25 of the air conditioning unit 4 while its flow direction is changed substantially horizontally by the horizontal duct 5b of substantially triangular section. The distribution of air flow rate at the time shows that a high-speed air in the radially outer side of the air blowing unit 3 flows through the vehicle body rear side of the horizontal duct 5b, i.e., the wider sectional area of substantially triangular shape in the horizontal duct 5b, and is sent to the casing 30. In other words, a high-speed air flows through the vehicle body rear side, while a relatively low-speed air flows through the narrower sectional area of substantially triangular shape in the horizontal duct 5b, i.e., the vehicle body front side of the horizontal duct 5b. Therefore, it can be minimized that the air flow interferes with the condensate flow collected to the drain port 80 located toward the vehicle body front.

Portions of the cooling heat exchanger 33 through which the high-speed air passes are located toward the rear of the vehicle body and are located at the higher side of the obliquely inclined heat exchanger 33. The condensate produced in the cooling heat exchanger 33 falls down on the outer surfaces of the flat tubes 33a and the corrugate fins 33b, and flows directly on the bottom surfaces of the corrugate fins and flat tubes from the vehicle body rear side to the vehicle body front side of the heat exchanger. Otherwise, the condensate flows from the bottom surfaces of the corrugate fins 33b to the bottom surfaces of the flat tubes 33a and then flows on the bottom surfaces of the flat tubes 33a from the vehicle body rear side to the vehicle body front side of the heat exchanger. Thereby, it can be largely suppressed that the condensate produced in the cooling heat exchanger is introduced above the cooling heat exchanger, i.e., into the heating heat exchanger, by the high-speed air flow.

The condensate tends to flow into the vehicle body front side of the cooling heat exchanger, i.e., the lower side thereof. The air flow in this side, however, is at a relatively low rate, and the air flow has a lower rate and approximates a flow rate of zero with approach to the front of the heat exchanger. Therefore, the possibility that the condensate collected at the front side of the cooling heat exchanger is introduced into the heating heat exchanger by the air flow is extremely low.

Further, the cooling heat exchanger has a configuration that allows the condensate to be promptly discharged, which provides a high heat exchanger effectiveness.

Furthermore, a rib 84 is provided in a standing manner on the bottom wall part 31 of the casing 30 at a position closer to the vehicle body front than the flat surface portion 31a and along the flowing direction of the air introduced through the intermediate duct 5. The rib 84 can prevent the condensate collected at the drain port 80 from being taken into the evaporator 33 by the air flow sent to the air conditioning unit 4. The condensate, in particular, tends to obliquely downwardly flow on the bottom surface of the evaporator 33 and then fall down, at the vehicle body front side thereof, to the bottom wall part 31. Therefore, the condensate is most likely to fall down, at the side of the evaporator 33 closer to the vehicle body front than the rib 84, to the bottom wall part 31. The rate of air flow at the side of the bottom wall part 31 closer to the vehicle body front than the rib 84 is relatively low, and the interference of the air flow with dropping down and collection of condensate can be significantly reduced.

Further, an attachment part 85 for attaching the air conditioning unit 4 to the dash panel P is provided integrally with the exit 82 of the drain passage 81. In attaching the air conditioning unit 4, a stud bolt fixed to the dash panel P is inserted into a hole of the attachment part 85, and then the dash panel P is fastened by the stud bolt and a nut. Therefore, when the drain pipe 83 is assembled with the dash panel P, the drain pipe 83 and the dash panel P are free from wobbling to enhance sealing property. The air conditioning unit 4 is divided into two sections one on another, and the casing 30 consists of the body part 32 forming an upper casing and the side wall part 31 forming a lower casing. Further, the body part 32 is divided into right and left portions. The evaporator 33 and the heater core 34 are held sandwiched between the two divided portions of the body part 32. This facilitates the assembly of the evaporator 33 and heater core 34 and ensures their retention. Furthermore, in order to take only the evaporator 33 out of the air conditioning unit 4 without disassembling the body part 32, a cover as a separate member is provided on the left side wall 30*a* (the air blowing unit side) of the casing 30. The upper half of the horizontal duct 5*b* or a cover 81*b* for the drain passage 81 may be provided on the cover, or may be left formed together with the body part 32.

Use of such a divided configuration of the casing eliminates the need for vertical separation of the bottom wall part 31 and therefore eliminates fear of leakage of condensate.

Next, the drain passage will be described in detail. In general, for the formation of the drain passage 81 as a hollow body integral with the bottom wall part 31, an elongated core has to be set in molding the bottom wall part 31. It is difficult to form a deep, narrow, elongated groove due to difficulties in precise fabrication of the core and suitable adjustment of the draft angle. Therefore, the formation of an elongated groove has a limitation.

On the contrary, in the present invention, the drain passage 81 is formed by two separate parts, i.e., an elongated groove part 81*a* and a cover 81*b*. The elongated groove part 81*a* is formed integrally with the bottom wall part 31, while the cover 81*b* is formed integrally with the body part 32. This enables easy formation of the elongated groove part 81*a* even if the depth and length thereof are rather large, provides flexibility to the shape and size of the drain passage 81, ensures a space for storing condensate, and provides the configuration of the space that can drain off condensate smoothly. Furthermore, there can be increased design flexibility to the position at which the drain pipe 83 is to be attached to the dash panel P.

The heater core 34 is a heating heat exchanger for heating the air having passed through the evaporator 33, and is made of tubes and fins stacked in the same manner as in the evaporator 33. In the heater core 34, a high-temperature cooling water from the engine circulates in the tubes to heat the air passing through the heater core 34. The heater core 34 is provided with heater pipes 91, one for introducing the engine cooling water and the other for discharging it. Like each cooler pipe for the evaporator 33, each heater pipe 91 is formed to extend outwardly from the left side wall 30*a* of the casing 30 and then extend toward the front of the vehicle body. Therefore, the heater pipes 91 are also disposed in the space between the air conditioning unit 4 and the air blowing unit 3, which provides effective use of this space. Furthermore, since the heater pipes 91 are located above the intermediate duct 5, the front passenger does not touch these pipes and therefore the attachment of heat insulators to the heater pipes can be eliminated.

This embodiment is designed so that various heater cores 34 different in height can be disposed inside of the casing 30. This embodiment, in particular, is the type provided with a short heater core 34. Therefore, in this embodiment, the casing has a small opening area formed in accordance with such a short heater core 34, and the other portions of the casing are not different from the other types. If a tall heater core is used, the opening area is formed in accordance with the height of the heater core and the other portions are common to the other types. In other words, two air mixing dampers 36 and 37 and a partition 40 are not changed but are common among plural types of casings.

Between the evaporator 33 and the heater core 34, two air mixing dampers (temperature control dampers) 36 and 37 are disposed for controlling the temperature of a conditioned air. The temperature control of the air mixing dampers 36 and 37 is made by changing the ratio of air having passed through the evaporator 33 between the flow rates of a partial air passing through the heater core 34 and another partial air passing through a bypass passage 38 for allowing part of the air having passed through the evaporator 33 to bypass the heater core 34.

More specifically, as shown in FIG. 6, the inner space of the casing 30 in the air conditioning unit 4 is divided into an evaporator space 41 for accommodating the evaporator 33 and a heater core space 42 for accommodating the heater core 34 by a partition 40 formed integrally with the inner surface of the casing 30. This partition 40 consists of a front partition 40*a* toward the vehicle body front and a rear partition 40*b* toward the vehicle body rear. In the sectional view of the air conditioning unit 4 looking in the car widthwise direction in FIG. 6, the front partition 40*a* extends substantially horizontally and the rear partition 40*b* has the shape of an inverted V. The front and rear partitions 40*a* and 40*b* have respective openings 43 and 44 for bringing the evaporator space 41 into communication with the heater core space 42. The openings 43 and 44 are opened and closed by the air mixing dampers 36 and 37, respectively. The rear partition 40*b* has also an opening 48 located at the rear of the heater core space 42. The opening 48 communicates the bypass passage 38 with the evaporator space 41.

Although not shown, a rib may be provided integrally on the inner surface of the casing 30 between the lower end of the air mixing damper 36 in open position and the evaporator 33. Such a rib smoothly guides the air flow from the evaporator into the inside of the casing, and prevents the air flow from entering between the lower end of the air mixing damper 36 and the casing inner surface.

The two air mixing dampers 36 and 37 each have a shaft extending in the car widthwise direction like the inside/outside air switching damper 12. Both ends of the shaft is supported to the casing 30, and the left end of the shaft is coupled via a link mechanism 46 to the output shaft of an actuator 45 disposed on the left side wall 30*a* of the casing 30. The actuator 45 is fixed to a boss extended from the casing left side wall 30*a*, like the actuator 15 for the inside/outside air switching damper 12.

The two air mixing dampers 36 and 37 are cooperated with each other via the link mechanism 46, and angularly moved by the actuator 45 from the position that fully opens the front-side and rear-side openings 43 and 44 to the position that fully closes them. In this case, when the rear-side air mixing damper 37 is angularly moved to the position that fully opens the rear-side opening 44, it fully closes the opening 48 at the upstream end of the bypass passage 38 to pass almost all the air through the heater core 34.

The two air mixing dampers 36 and 37 are preferably different in opening/closing timing for precise control, but may optionally have the same opening/closing timing. In this embodiment, when the air mixing damper 36 is fully opened, the other air mixing damper 37 is opened halfway. Then, the air mixing damper 37 is rotated to the full. When both the air mixing dampers 36 and 37 are closed, they are rotated in the reverse order.

The actuator 45 for the air mixing dampers 36 and 37 also has a coupler 49 (shown only in FIGS. 3 and 5) to which a signal line from the air conditioning controller is connected, like the actuator 15 for the inside/outside air switching damper 12.

The evaporator 33 is equipped with a temperature sensor (not shown) for detecting the surface temperature of the evaporator 33. The heater core 34 is equipped with a water temperature sensor (not shown) for detecting the temperature of the engine cooling water in the heater core 34. Signal lines from these sensors are extended through the left side wall 30a of the air conditioning unit 4 and are connected to the air conditioning controller.

The upper portion of the casing 30 has a plurality of vents 50, 50, . . . formed in an inclined rear surface and defrosting vents 51, 51 formed in an approximately flat surface located at the front of the inclined rear surface. Further, the upper portion of the casing 30 also has leg vents 52 (only right one is shown in FIG. 6) formed in the left and right side walls 30a and 30b (as shown in FIGS. 5 and 10), respectively. The vents 50, 50 are connected with vent grilles 53, 53, . . . disposed in the instrument panel 2 as shown in FIG. 4 through vent ducts (not shown). Conditioned airs from the vents 50 are mainly blown toward the upper halves of the passengers. On the other hand, the defrosting vents 51, 51 are connected with defrosting grilles 54, 54 disposed at the front end of the instrument panel 2 through defrosting ducts (not shown). Conditioned airs from the defrosting vents 51 are blown toward the inner surface of the front window. The right and left leg vents 52, 52 are connected to ducts 57, 56 extending downward, respectively. Both the ducts 56, 57 are open in the under surface of the instrument panel 2 in the vicinities of the driver's and passenger's legs, respectively, from which conditioned airs are blown toward the driver's and passenger's legs.

Out of the ducts 56 and 57 connected to the leg vents 52 and 52, the driver's side duct 56 is provided integrally with the casing 30 to turn from the right side wall 30b of the casing to the rear side wall thereof, has a relatively large sectional area, and therefore serves as a dual-purpose duct for both front and rear seats through which a conditioned air for rear passengers passes together with a conditioned air for front passengers. The front of a portion of the dual-purpose duct 56 corresponding to the casing right side wall 30b is formed with openings 55, 55 for blowing out the conditioned air toward the driver's seat as described above. The bottom of a portion of the dual-purpose duct 56 corresponding to the casing rear wall is formed with connecting parts 58, 58 to which the upper ends of floor ducts (not shown) for guiding the conditioned air toward the rear passengers are connected.

Inside of the casing 30 of the air conditioning unit 4, two blow-out direction switching dampers 60 and 61 are provided for opening and closing the vents 50, 51 and 52 to change the blow-out direction of the conditioned air, in the same manner as with the air mixing dampers 36 and 37. These dampers 60 and 61 are operated by a link mechanism 62 disposed on the left side wall 30a of the casing 30 of the air conditioning unit 4 and an actuator 63 fixed to the boss on the left side wall 30a.

Front-side one of the blow-out direction switching dampers 60 and 61 is a defrosting damper 60 for opening and closing the defrosting vents 51 and 51, while rear-side one is a vent damper 61 for opening and closing the vents 50, 50, . . . The dampers 60 and 61 are cooperated with each other via the link mechanism 62, and each driven by the actuator 63 to openings corresponding to a plurality of air blowing modes. Specifically, the air conditioning unit 4 is changeable, according to the open/closed positions of the two dampers 60 and 61, to any one of the air blowing modes including vent mode, defrosting mode, leg mode, and bi-level mode in which air is blown out through the vents 50 and the leg vents 52. The actuator 63 for the blow-out direction switching dampers 60 and 61 also has a coupler 65 (shown in FIGS. 3 and 5) to which a signal line from the air conditioning controller is connected, like the actuator 15 for the inside/outside air switching damper 12.

As described above, the link mechanisms 46 and 62 and the actuators 45 and 63 for the dampers 36, 37, 60 and 61 in the air conditioning unit 4 are together disposed on the left side wall 30a of the air conditioning unit 4. Therefore, these components can be attached to the air conditioning unit 4 at a time from a single direction in assembling the air conditioning unit 4.

Next, description will be made about the installation of the air conditioner 1 on the vehicle body. Attachment parts for the air blowing unit 3 and the air conditioning unit 4 will be first described. The air blowing part 8 of the air blowing unit 3 is provided at the right and left sides with a pair of attachment legs 68 and 68. The filter accommodation part 21 is provided with an attachment leg 69 extending from the right side wall toward the right side of the vehicle body. On the other hand, attachment parts for the air conditioning unit 4 includes an attachment part 85 on an attachment leg 70 formed integrally with the drain 35, and attachment parts on a pair of attachment legs 71 and 71 provided at the right and left side of the top of the casing 30.

Figure 12:
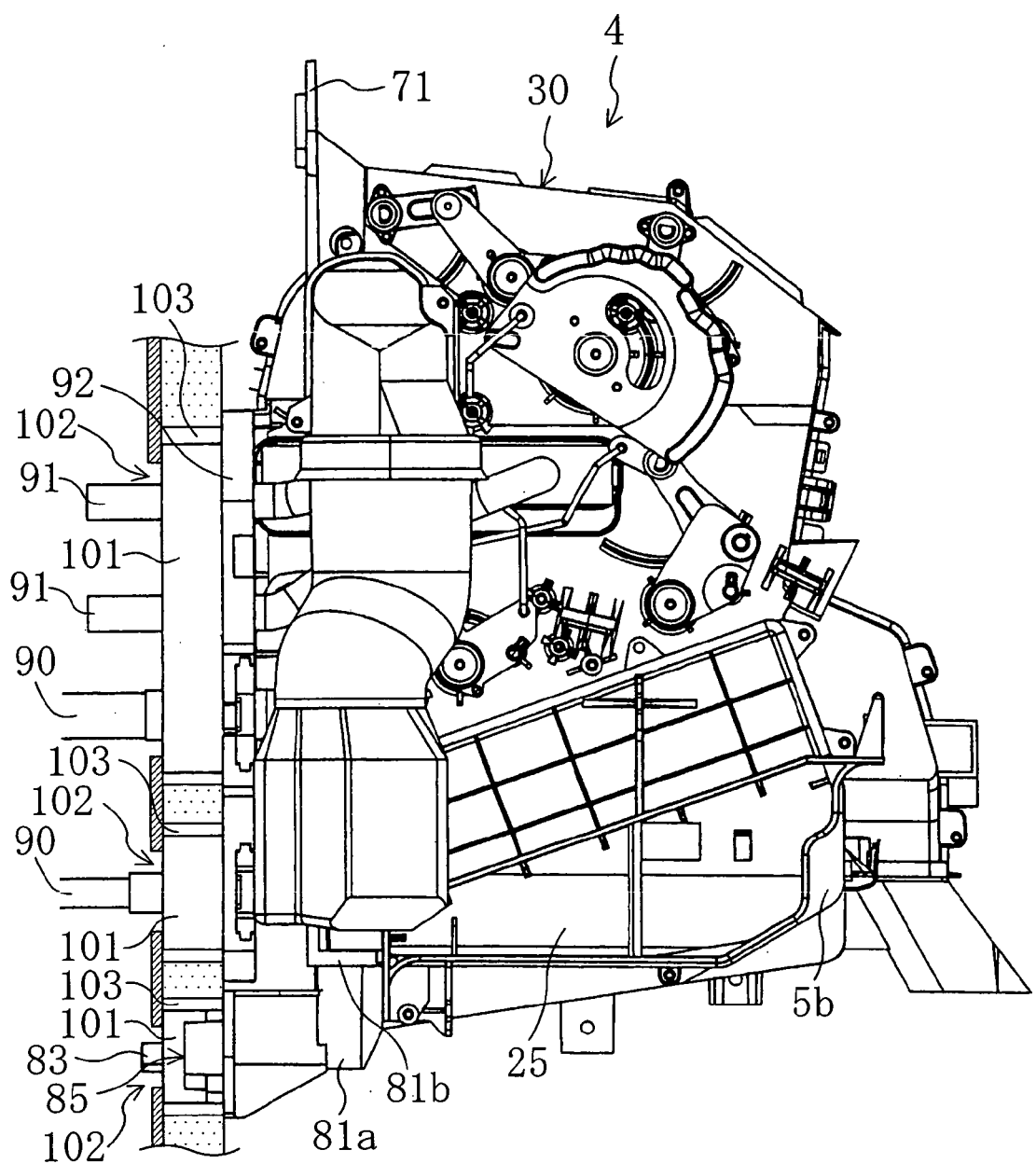
FIG. 12 is a view of the air conditioner as seen from the air blowing unit side, wherein the air conditioning unit is attached to a dash panel.
Figure 13:
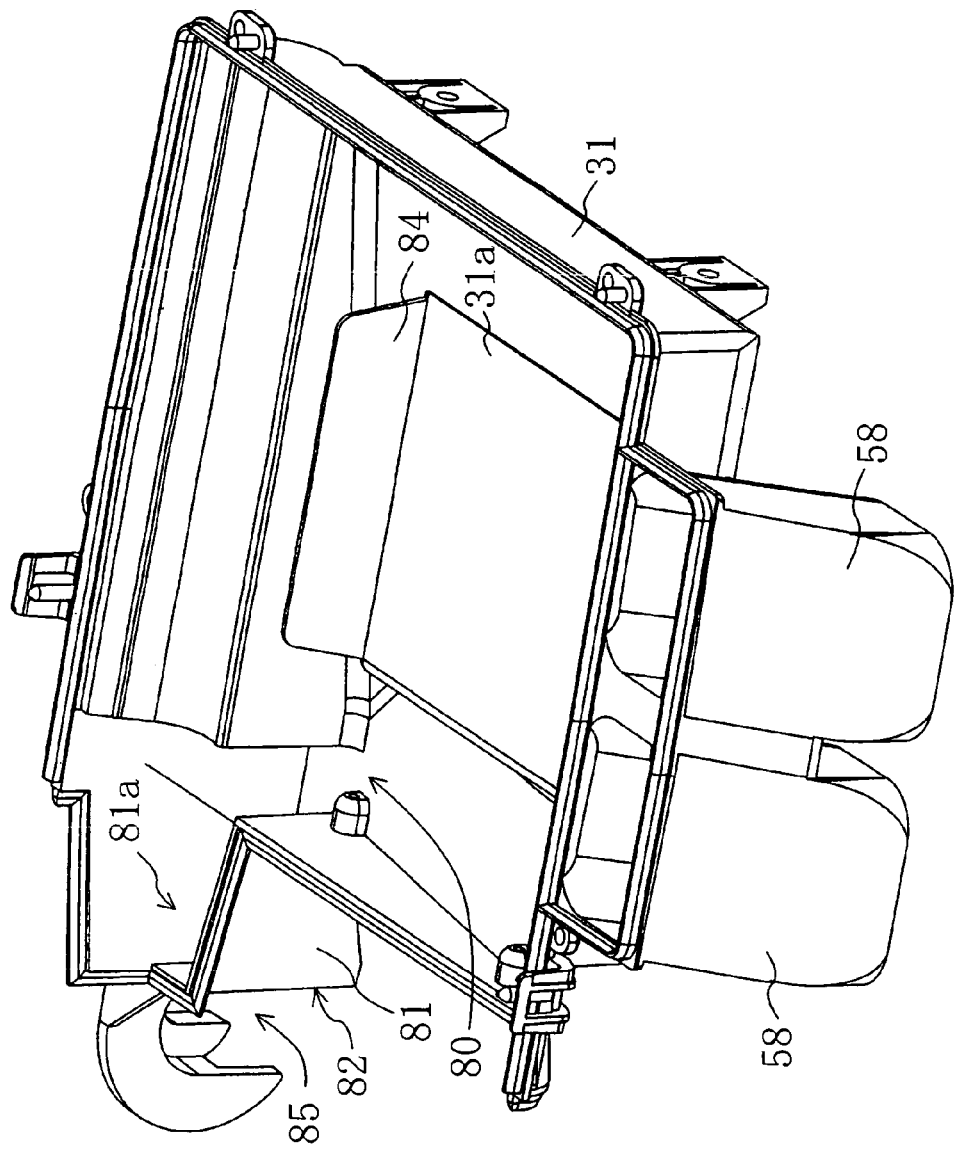
FIG. 13 is a perspective view of a bottom wall part of the air conditioning unit as seen from the left rear.
Figure 14:
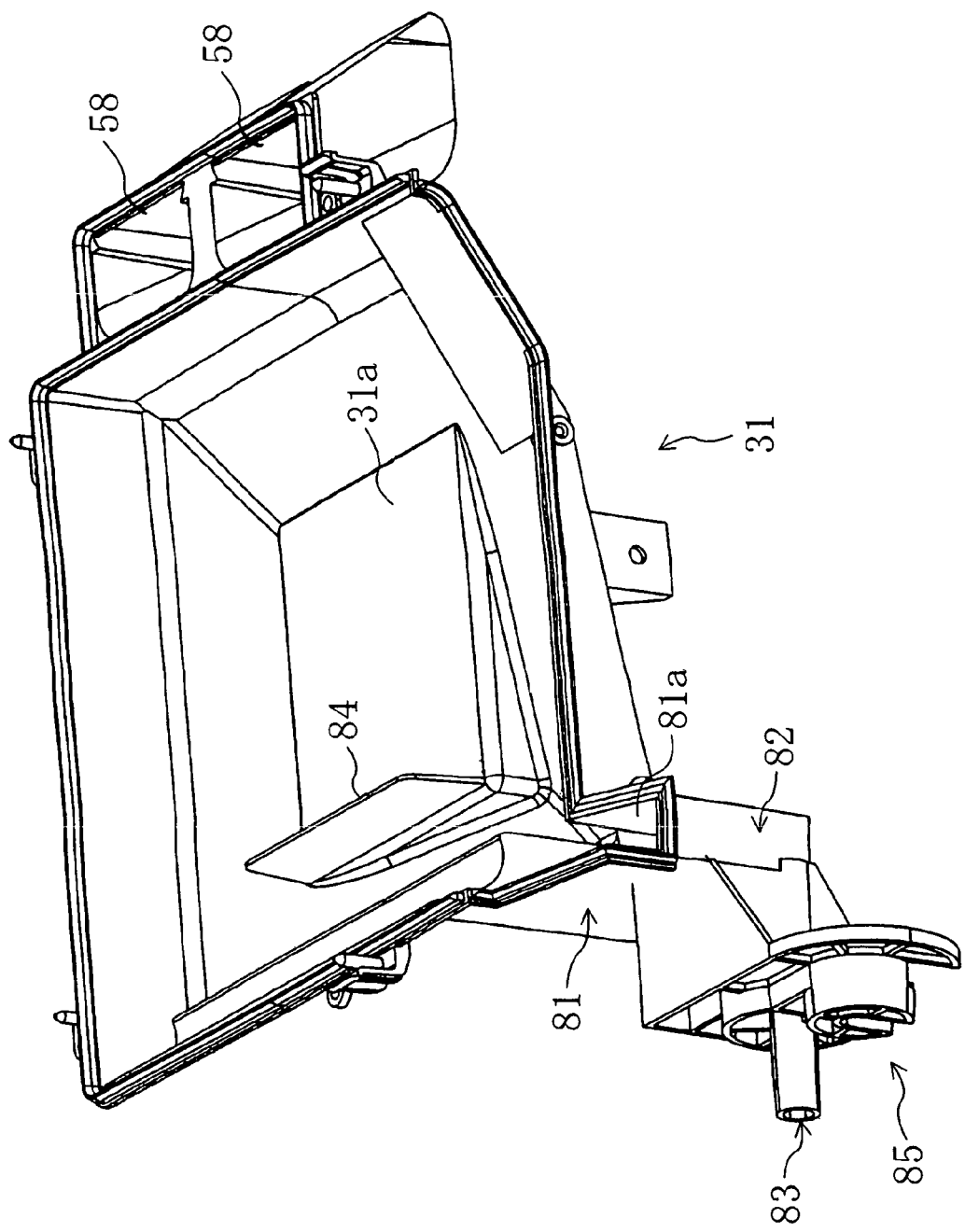
FIG. 14 is a perspective view of the bottom wall part of the air conditioning unit as seen from the right front.
Figure 15:
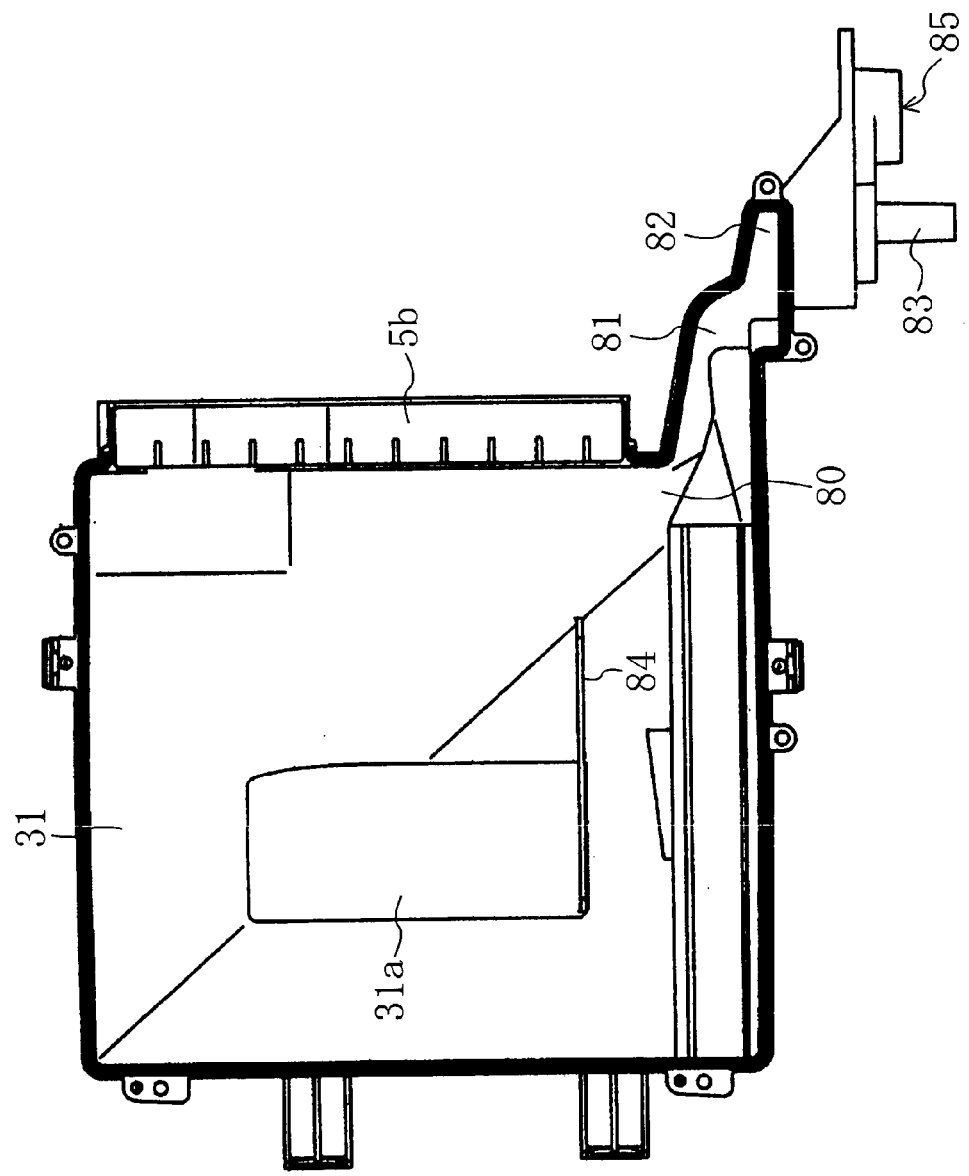
FIG. 15 is a plan view of the bottom wall part of the air conditioning unit.
Figure 16:
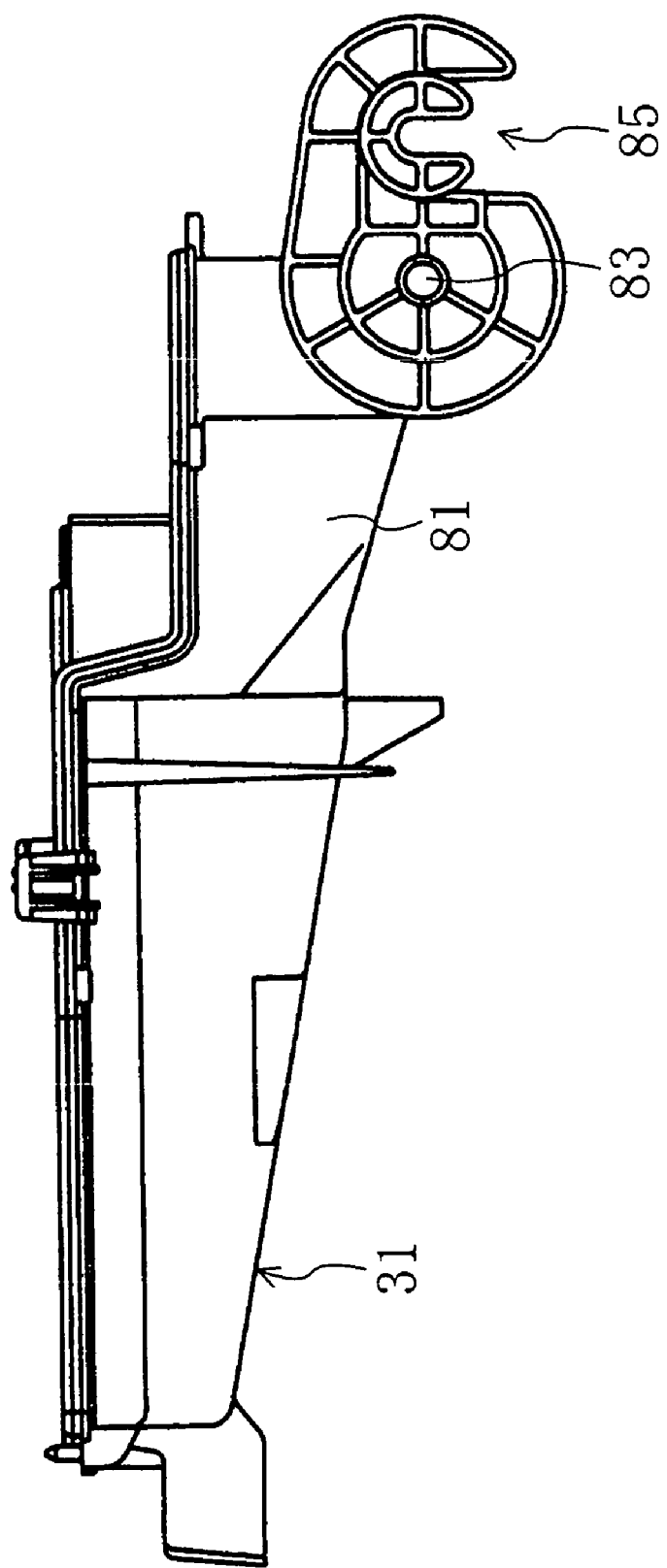
FIG. 16 is a front view of the bottom wall part of the air conditioning unit.
Figure 17:
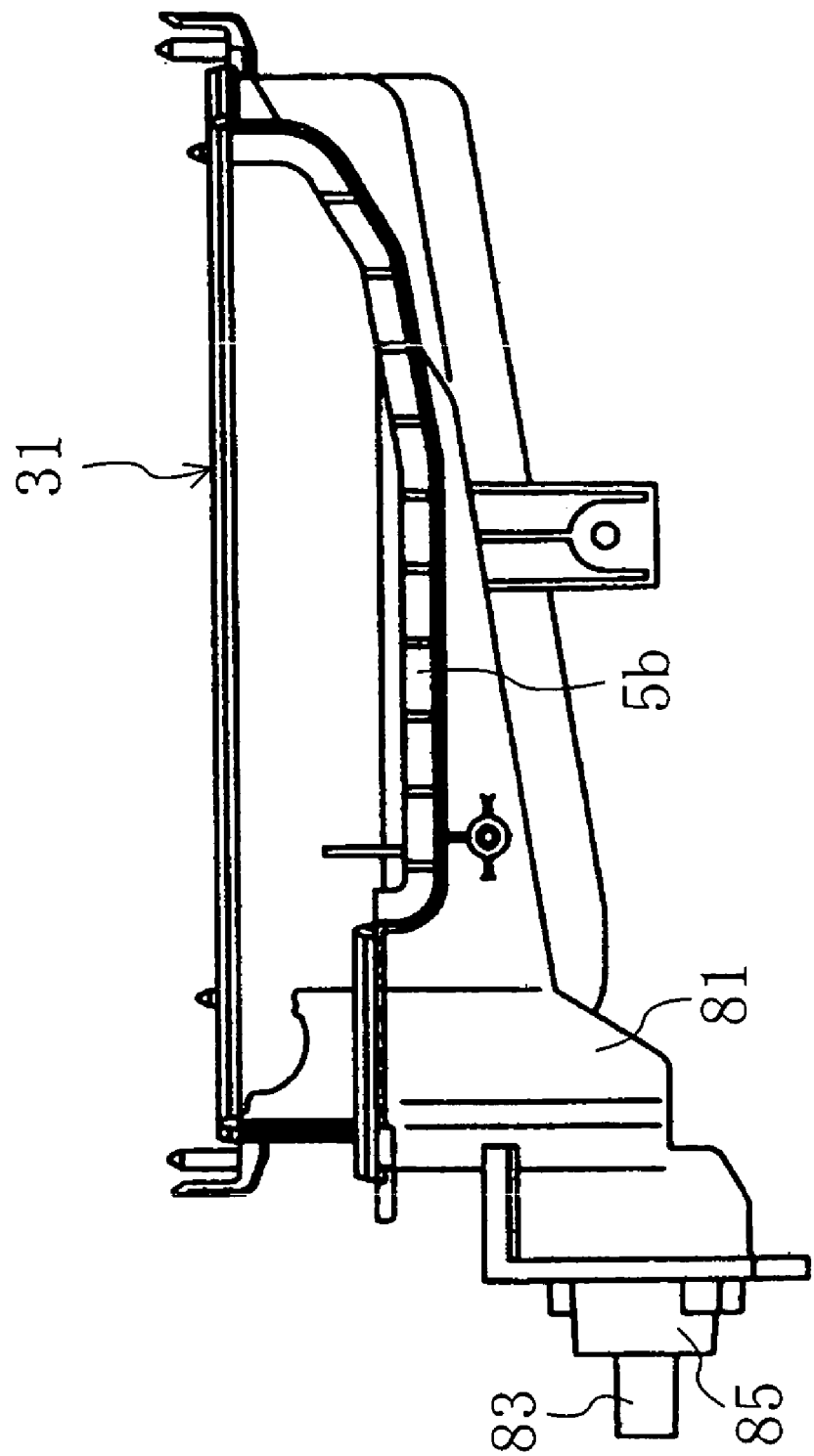
FIG. 17 is a side view of the bottom wall part of the air conditioning unit.

The attachment legs 68, 69, 70 and 71 of the air blowing and air conditioning units 3 and 4 are formed with through holes, respectively. The dash panel P is provided with stud bolts (not shown) attached to align themselves with the through holes. As shown in FIG. 12, the dash panel P is formed with through holes 102 corresponding to the respective positions where the cooler pipes 90, the heater pipes 91 and the drain passage 81 are disposed. With this configuration, when the air conditioner 1 is positioned with respect to the vehicle body to insert the stud bolts into the corresponding through holes in the attachment parts 68–71 of the units 3 and 4, the cooler pipes 90 and the heater pipes 91 are presented to the engine room through the through holes 102 in the dash panel P. In this state, nuts are screwed on the stud bolts thereby firmly fixing the air conditioner 1 to the vehicle body. Furthermore, the cooler pipes 90 and the heater pipes 91 are connected to corresponding pipes in the engine room, while the drain pipe 83 is connected to a final drain pipe. The connection work for all the cooler, heater and drain pipes 90, 91 and 83 can be carried out at close hand from the engine room side, which reduces the number of processes.

Next, the sealing mechanism of the air conditioner 1 and the dash panel P will be described. A dash insulator D is attached to the passenger's room side of the dash panel P. Cushion sealing members 101 are attached to the outer peripheries of the cooler, heater and drain pipes 90, 91 and 83. In this embodiment, a single sealing member 101 is attached to the heater pipes 91 and one of the cooler pipes 90. Another two sealing members 101 are attached individually to the other cooler pipe 90 and the drain pipe 83.

The dash panel P is formed with through holes 102 for passing the corresponding pipes 90, 91 and 83 therethrough. The dash insulator D is formed with openings 103 larger in diameter than the through holes 102 and smaller in diameter than the recesses in the bracket 92. With this configuration, in assembly, the bracket 92 is pressed against the dash insulator D to seal the openings 103 and the sealing members 101 are pressed against the dash panel P to seal the through holes 102 in the dash panel P. Such a double sealing structure increases sealing properties.

Furthermore, in the air conditioner for an automobile according to this embodiment, an air from the air blowing unit 3 is sent to the air conditioning unit 4 through the intermediate duct 5. The link mechanisms 46 and 62 and actuators 45 and 63 for the air mixing dampers 36 and 37 and the air blow-out direction switching dampers 60 and 61 in the air conditioning unit 4 are attached to the air blowing unit side of the air conditioning unit casing 30. The actuator 15 for the inside/outside air switching damper 12 in the air blowing unit 3 is attached to the air conditioning unit side of the air blowing unit casing 6. Therefore, the link mechanisms 46 and 62 and the actuators 15, 45 and 63 can be accommodated in a dead space located above the intermediate duct 5, thereby reducing the size of the air conditioner 1 and the installation space therefore. Furthermore, the link mechanisms 46 and 62 and the actuators 45 and 63 can be assembled with the air conditioning unit casing 30 from a single direction. This reduces the number of assembly processes for the air conditioning unit 4.

The couplers 17, 27, 49 and 65, which connect the actuators 15, 45 and 63 for the dampers 12, 36, 37, 60 and 61, the temperature sensor for the evaporator 33, the water temperature sensor for the heater core 34 and the control circuit 26 for the air blowing fan 23 with the air conditioning controller, are collected in the space between the air blowing unit 3 and the air conditioning unit 4. This reduces the number of processes for assembly of the air conditioner 1 with the vehicle body.

The right side wall 30b (the driver's side) of the air conditioning unit 4 is not provided with the link mechanisms 46 and 62 and the actuators 45 and 63, which increases the sectional area of the driver's side duct 56 and the design flexibility to the duct 56. This increases the usefulness of the right side wall 30b of the air conditioning unit 4. In other words, the amount of air blow for the driver and passengers can be ensured sufficiently by the duct 56 alone. In addition, a space in the vicinity of the driver's legs can be increased.

FIGS. 19 to 23 show an air conditioner according to another embodiment of the present invention. This embodiment is directed to an air conditioner for a left-hand drive car in which the air conditioning unit 4 is placed substantially in the car widthwise middle of the instrument panel 2 and the air blowing unit 3 is placed to the front-passenger's seat side of the air conditioning unit 4 (toward the right of FIG. 19). Description will be made about only different parts from the first embodiment, and will be omitted about the other parts.

Two heater pipes 91 are juxtaposed one above the other like the first embodiment, while two cooler pipes 90 are disposed laterally and collected by a block 100. The vertical plane that divides the bracket 92 into the fixed and detachable brackets 92a and 92b runs through the vertical center lines of the heater pipes 91 and the center line of the block 100. The seal plate 93a is assembled into the fixed and detachable brackets 92a and 92b by being slidingly inserted into them from below. The seal plate 93a has recesses whose diameters correspond to the outer diameters of the two cooler pipes 90 and which surround two thirds of the pipes to simultaneously fix the two cooler pipes 90. This increases the retention to the cooler pipes 90 when the seal plate 93a is inserted into the brackets.

The outer diameters of the cooler and heater pipes 90 and 91 herein referred to may be actual outer diameters thereof or, if fitting members such as cushion members or heat insulators are fitted onto the pipes, may be outer diameters of the fitting members or the compressed fitting members.

Figure 22:
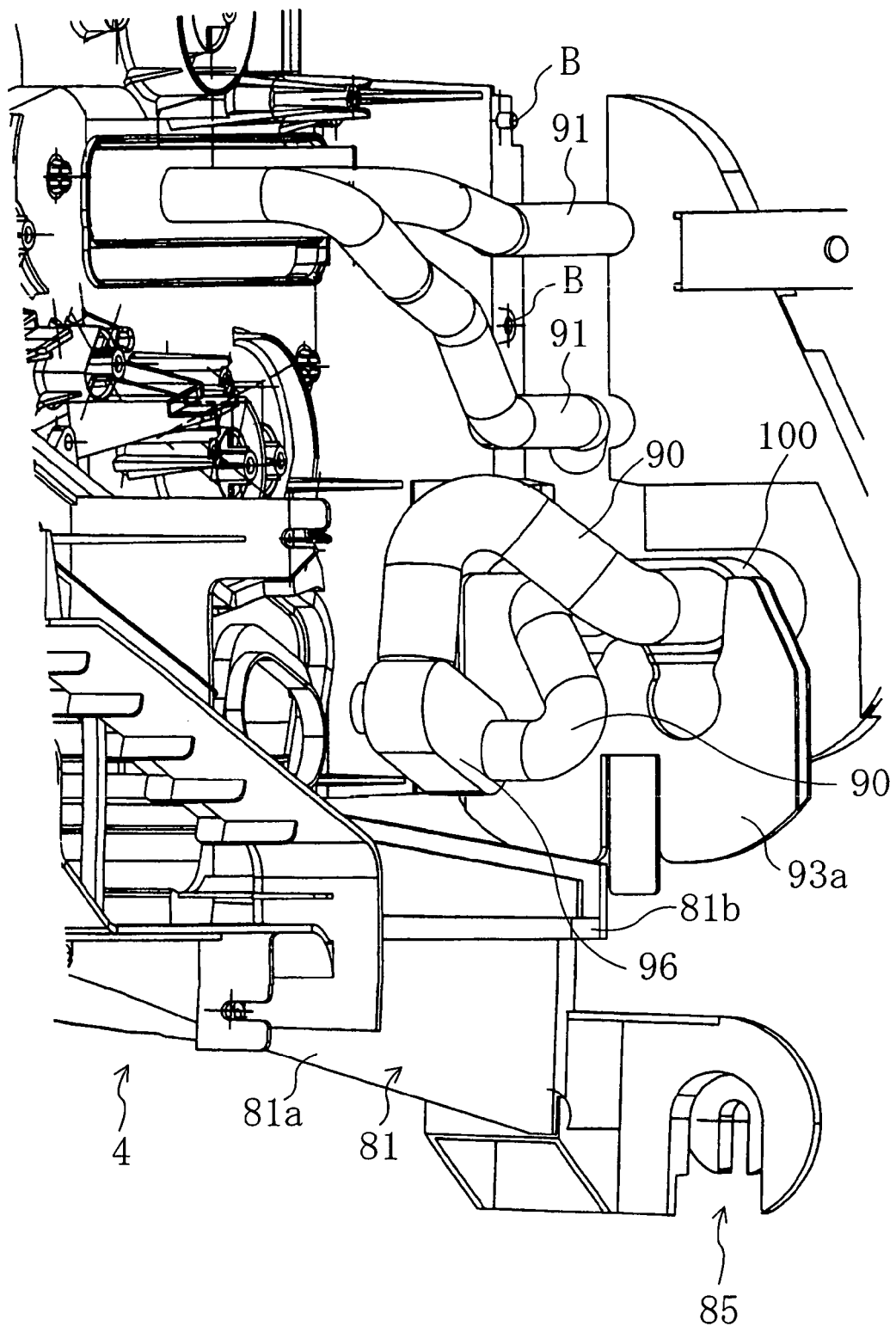
FIG. 22 is a view of the bracket of FIG. 21 seen from the opposite direction.
Figure 23:
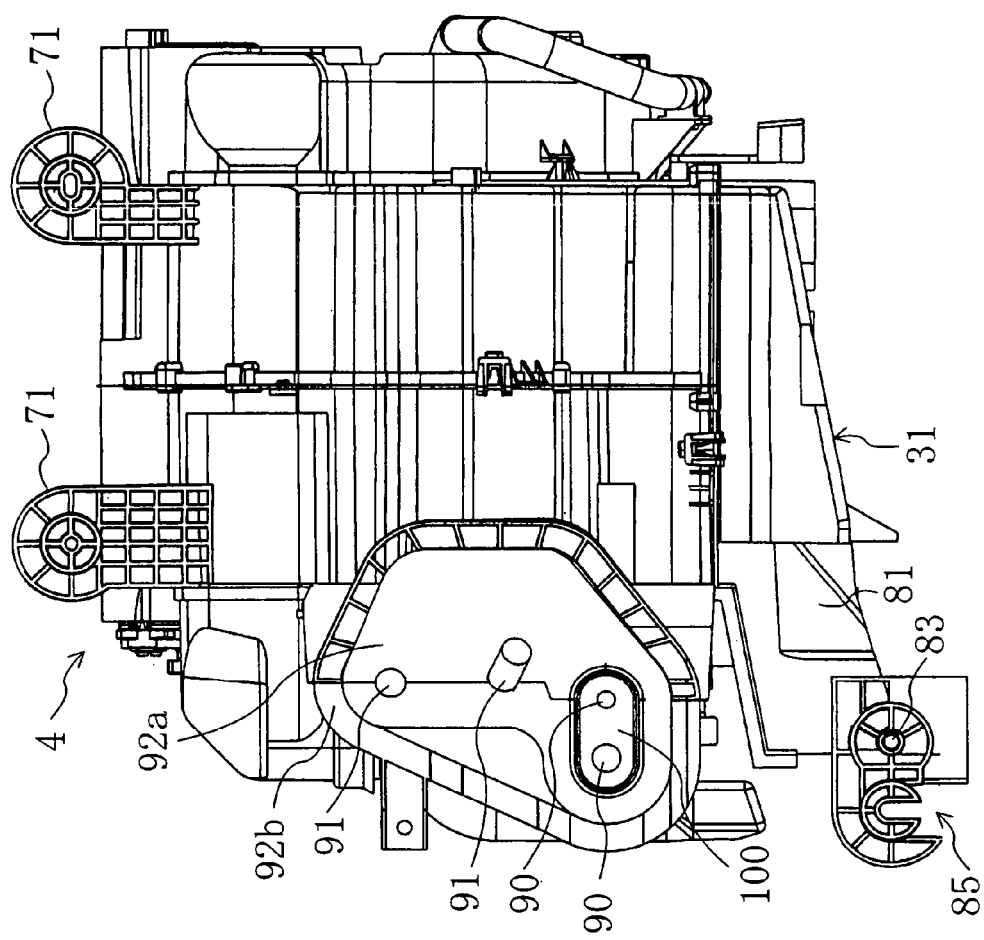
FIG. 23 is a view of the air conditioning unit of the air conditioner of FIG. 19 as seen from the engine room side.

FIG. 24 shows an exemplary attachment structure of the expansion valve box 96. As shown in FIG. 22, the expansion valve box 96 is disposed in the outside wall of the body part 32 in an embedded manner. Typically, when the expansion valve box 96 is assembled with the casing 30 by connecting it to the evaporator 33, a butyl rubber member or the like is adhered to an exposed portion of the expansion valve box 96 to cover the exposed portion, thereby preventing exposure to the outside air and condensation. In this embodiment, however, an extended wall 30a is formed integrally with the casing 30 to surround the expansion valve box 96. The expansion valve box 96 is first accommodated in the extended wall 30a, the extended wall 30a is covered with a cover 30b in close contact, and the extended wall 30a and the cover 30b are fastened with a bolt. In this manner, the expansion valve box 96 can be prevented from being exposed to the outside air. At the removal of the expansion valve box 96, the cover 30b need only be detached. On the other hand, at the attachment of the expansion valve box 96, it is necessary only to accommodate the expansion valve box 96 in the extended wall 30a and then insert the cover 30b onto the extended wall 30a again. This provides easy attachment and detachment of the expansion valve box 96. Further, no sealing member such as a butyl rubber is consumed for each attachment, which results in reduced cost and improved environment.

In the embodiment of FIG. 22, two cooler pipes connected to the expansion valve box are provided to extend substantially at a right angle from each other. Two cooler pipes, however, may be extended in the same direction. In particular, two cooler pipes may be arranged toward the cover 30b and extended in a direction in which the cover is inserted onto and pulled out of the expansion valve box. Further, the extended wall may be higher than the height of the expansion valve to cover the expansion valve. Alternatively, the extended wall may be lower than the height of the expansion valve and the cover may have a flange for covering the periphery of the expansion valve.

Furthermore, in the above embodiments, the intermediate duct 5 has an inclined duct 5a as a separate member and a horizontal duct 5b formed integrally with the casing 30. However, the inclined and horizontal ducts 5a and 5b may be integrally formed to separate them from the casing 30.

The above embodiments are directed to air conditioning units of the type that the evaporator is inclined in a car lengthwise direction. However, the present invention is applicable, depending upon components to be provided, to the type that the evaporator is inclined in a car widthwise direction.

INDUSTRIAL APPLICABILITY

As can be seen from the above, vehicle air conditioners of the present invention is suitable for downsizing.

The invention claimed is:

1. An air conditioner for a vehicle comprising:
an air conditioning unit disposed substantially in an inside middle portion of an instrument panel in a widthwise direction of the vehicle;
an air blowing unit disposed to a front-passenger's side of the air conditioning unit; and
an intermediate duct for conducting air from the air blowing unit to the air conditioning unit,
a cooling heat exchanger including cooling pipes and a heating heat exchanger including heating pipes are juxtaposed one above the other in the air conditioning unit to produce conditioned air, said cooler pipes and said heater pipes project from a side wall part of the air conditioning unit on the same side as the air blowing unit and are bent to extend toward a front portion of the vehicle, distal ends of said cooler pipes and said heater pipes projecting outwardly from through holes formed in a dash panel placed at a vehicle front side of the air conditioning unit toward an engine room side of the vehicle;
wherein said cooler pipes and said heater pipes are supported by the air conditioning unit by respective projecting parts extending toward the vehicle front side, and air, introduced from the intermediate duct into the air conditioning unit passes through the cooling heat exchanger and the heating heat exchanger to produce a conditioned air,
wherein, the heater pipe includes an introduction pipe for introducing a heat medium for heat application into the heating heat exchanger and a discharge pipe for discharging the heat medium for heat application from the heating heat exchanger;
a part of the introduction pipe and a part of the discharge pipe, extending toward the front portion of the vehicle, are arranged one above the other;
wherein the air conditioning unit includes a bracket that supports the introduction and discharge pipes at each of the parts extending toward the front portion of the vehicle, the bracket including a fixed bracket portion which is fixed to the air conditioning unit and a detachable bracket portion which is fixed to the fixed bracket portion, and the fixed bracket portion has two recesses shaped to correspond to an outer surface of the air conditioning unit side of the introduction and discharge pipes, and the detachable bracket portion has two recesses shaped to correspond to an outer surface of the air blowing unit side of the introduction and discharge pipes.

2. The air conditioner for a vehicle as defined in claim 1, further comprising a bracket for supporting the cooler pipes, wherein the bracket is separated by a line passing through a middle of the cooler pipe in its radial direction, the bracket including a fixed bracket portion fixed to the air conditioning unit and a detachable bracket portion detachably attached to the fixed bracket.

3. The air conditioner for a vehicle as defined in claim 2, further comprising a recess corresponding to a shape of the outer surface of the cooler pipe formed in the fixed bracket for supporting the cooler pipes and a recess corresponding to the shape of the outer surface of the cooler pipe formed in the detachable bracket for supporting the cooler pipes;
wherein a diameter of an opening formed by the recess of the detachable bracket and the recess of the fixed bracket when the detachable bracket is attached to the fixed bracket, is larger than an outer diameter of the cooler pipe forming a clearance between the recesses and the outer surface of the cooler pipe, and
the bracket for supporting the cooler pipes includes a detachable seal plate, the seal plate being fixed to the cooler pipe while attached to the bracket.

4. The air conditioner for a vehicle as defined in claim 3, wherein the seal plate is attached to and detached from the bracket by moving the seal plate in the radial direction of the cooler pipe; and
the seal plate includes a recess corresponding to the shape of the outer surface of the cooler pipe.

5. The air conditioner for a vehicle as defined in claim 1, wherein the bracket of the air conditioning unit includes a flat surface opposed to the dash panel, and the flat surface is pressed against peripheries of the through holes in the dash panel.

6. The air conditioner for a vehicle as defined in claim 1, further comprising an expansion valve box including an expansion valve, with the cooler pipe being connected to the cooling heat exchanger through the expansion valve box;
a casing of the air conditioning unit including an extended wall protniding outside the air conditioning unit which surrounds the expansion valve box; and
the air conditioning unit includes a cover for covering the extended wall from outside the air conditioning unit,
wherein the expansion valve box is covered by the extended wall and the cover.

7. The air conditioner for a vehicle as defined in claim 1, further comprising a drain part integrally formed with a bottom wall part of the casing,
wherein the cooling heat exchanger in the casing of the air conditioning unit is inclined downward in the rear to front direction of the vehicle body, air from the intermediate duct is introduced into a space provided under the cooling heat exchanger in the casing and an exit of condensate is formed at the drain part, the exit being positioned on the air conditioning unit side and on the vehicle front side.

8. The air conditioner for a vehicle as defined in claim 7, wherein the drain part includes a drain passage, wherein the drain part projects out from a side wall part of the air conditioning unit on the air blowing unit side, and the drain part is formed so that the exit is located closer to the front of the vehicle body than the intermediate duct.

9. The air conditioner for a vehicle as defined in claim 8, wherein the exit of the drain part is connected with a drain pipe extending toward the front of a vehicle.

10. The air conditioner for a vehicle as defined in claim 9, wherein a set of the heater pipes and a set of the cooler pipes are arranged one above the other; and the drain pipe is located below the heater pipes and the cooler pipes.

11. The air conditioner for a vehicle as defined in claim 10, further comprising an attachment part for attaching the air conditioning unit to the dash panel, the attachment part being integrally formed with the drain part and ajacent to the exit of the drain part.

* * * * *